(12) United States Patent
Aisu et al.

(10) Patent No.: US 11,860,621 B2
(45) Date of Patent: Jan. 2, 2024

(54) TRAVEL CONTROL DEVICE, TRAVEL CONTROL METHOD, TRAVEL CONTROL SYSTEM AND COMPUTER PROGRAM

(71) Applicant: KABUSHIKI KAISHA TOSHIBA, Tokyo (JP)

(72) Inventors: Hideyuki Aisu, Kawasaki (JP); Shizu Sakakibara, Kawasaki (JP); Michio Yamashita, Inagi (JP); Noriyuki Hirayama, Fuchu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 114 days.

(21) Appl. No.: 17/015,535

(22) Filed: Sep. 9, 2020

(65) Prior Publication Data
US 2021/0132627 A1  May 6, 2021

(30) Foreign Application Priority Data
Oct. 30, 2019 (JP) .................................. 2019-197806

(51) Int. Cl.
*G05D 1/02* (2020.01)
*G08G 1/16* (2006.01)
*G08G 1/00* (2006.01)

(52) U.S. Cl.
CPC ......... *G05D 1/0289* (2013.01); *G05D 1/0214* (2013.01); *G05D 1/0291* (2013.01); *G08G 1/166* (2013.01); *G08G 1/22* (2013.01)

(58) Field of Classification Search
CPC .. G05D 1/0289; G05D 1/0214; G05D 1/0291; G05D 1/0295; G05D 1/0297; G05D 2201/0216; G05D 1/0223; G08G 1/166; G08G 1/22; G06Q 10/047
See application file for complete search history.

(56) References Cited

U.S. PATENT DOCUMENTS

| 5,038,290 | A | 8/1991 | Minami |
| 5,625,559 | A | 4/1997 | Egawa |
| 7,873,469 | B2 | 1/2011 | D'Andrea et al. |

(Continued)

FOREIGN PATENT DOCUMENTS

| JP | 07-019177 B2 | 3/1995 |
| JP | 07-219633 A | 8/1995 |

(Continued)

OTHER PUBLICATIONS

Anonymous, "Trafficc light," Wikipedia, Retrieved from the Internet [URL: https://en.wikipedia.org/w/index.php?title=Traffic_light&oldid=564263846], Retrieved on Feb. 2, 2017, XP55341421, 23 pages (Continued)

*Primary Examiner* — Rodney A Butler
(74) *Attorney, Agent, or Firm* — Oblon, McClelland, Maier & Neustadt, L.L.P.

(57) ABSTRACT

According to one embodiment, a travel control device includes a passing order determiner configured to determine passing order of a plurality of mobile objects in a first area through which the plurality of mobile objects pass on a basis of a conflict condition at which conflict among the mobile objects occurs; and a controller configured to control traveling of the plurality of mobile objects on a basis of the passing order.

18 Claims, 17 Drawing Sheets

(56) References Cited

U.S. PATENT DOCUMENTS

| | | | |
|---|---|---|---|
| 7,920,962 B2 | 4/2011 | D'Andrea et al. | |
| 8,068,978 B2 | 11/2011 | D'Andrea et al. | |
| 9,811,090 B2 * | 11/2017 | Yoneda | G05D 1/0223 |
| 2013/0158742 A1 * | 6/2013 | Cooper | B61L 27/16 701/2 |
| 2014/0100735 A1 | 4/2014 | Yoneda | |
| 2014/0236413 A1 | 8/2014 | D'Andrea et al. | |
| 2018/0211546 A1 * | 7/2018 | Smartt | H04W 4/46 |
| 2019/0047468 A1 * | 2/2019 | Morimura | B60Q 1/50 |
| 2020/0139964 A1 | 5/2020 | Kuninobu et al. | |
| 2020/0293063 A1 | 9/2020 | Aisu | |
| 2021/0286373 A1 | 9/2021 | Aisu et al. | |

FOREIGN PATENT DOCUMENTS

| | | | |
|---|---|---|---|
| JP | 2953282 B2 | 9/1999 | |
| JP | 2000-285373 A | 10/2000 | |
| JP | 3279034 B2 | 4/2002 | |
| JP | 3364021 B2 | 1/2003 | |
| JP | 4138541 B2 | 8/2008 | |
| JP | 2020-077110 A | 5/2020 | |
| JP | 2020-149370 A | 9/2020 | |
| JP | 2021-149216 A | 9/2021 | |
| WO | WO 2007/149711 A2 | 12/2007 | |
| WO | WO 2013/005466 A1 | 1/2013 | |

OTHER PUBLICATIONS

Sen et al., "The Supervisory System of the Imperial College Free Ranging Automated Guided Vehicle Project", 1999 IEEE International Conference on Systems, Man, and Cybernetics, Oct. 13-16, 1991, pp. 1017-1022 (total 7 pages), XP000238065.

U.S. Appl. No. 16/564,539, filed Sep. 9, 2019, AISU.

* cited by examiner

DEADLOCK

COLLISION

```
A,20,20
B,20,120
C,100,20
D,100,40
E,140,20
F,140,40
G,200,20
H,,200,40
I,240,40
J,240,40
K,320,20
L,320,160
M,500,20
```

```
1,A,B
2,A,C
3,C,E
4,C,D
5,D,F
6,E,F
7,E,G
8,G,I
9,G,H
10,H,J
11,I,J
13,I,K
14,K,L
15,K,M
```

```
1,B,C,180
2,C,E,40
3,C,E,80
4,E,G,60
5,G,I,40
6,G,I,80
7,I,K,80
8,K,L,140
9,K,M,180
```

L, K, I, G, E, C, A, B, A, C, D, F, E, G, H, J, I, K, M,
K, I, G, E, C, A, B, A, C, D, F, E, G, H, J, I, K, L
ROUTE PLAN: EXAMPLE 1

L-Load, K, I, G, E, C, A, B-UnLoad, A, C, D, F, E, G, H, J,
I, K, M-Load, K, I, G, E, C, A, B-UnLoad, A, C, D, F, E, G, H, J, I, K, L
ROUTE PLAN: EXAMPLE 2

EXAMPLE OF TRAVEL TIMING SCHEDULES
OF MOBILE OBJECTS AGV 0, AGV 1, AND AGV 2

AGV0
MOVE-L-K-70.0, MOVE-K-I-37.0, MOVE-I-G-10.0, WAIT-52.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-L-70.0,

AGV1
MOVE-B-A-45.0, MOVE-A-C-47.0, MOVE-C-D-5.0, MOVE-D-F-10.0, MOVE-F-E-5.0, MOVE-E-G-36.0, MOVE-H-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, WAIT-4.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, MOVE-I-K-37.0, MOVE-K-M-104.0, WAIT-40.0, MOVE-M-K-104.0, MOVE-K-I-37.0, MOVE-I-G-10.0, MOVE-G-E-36.0, MOVE-E-C-10.0, WAIT-229.0, M-K-M-104.0, WAIT-40.0, MOVE-A-B-45.0, MOVE-C-A-47.0, MOVE-A-B-45.0,

AGV2
MOVE-K-I-37.0, MOVE-I-G-10.0, MOVE-G-E-36.0, MOVE-E-C-10.0, WAIT-20.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-8.0, MOVE-I-K-37.0, WAIT-40.0, MOVE-I-K-70.0, MOVE-K-L-70.0, WAIT-40.0, MOVE-I-K-70.0, MOVE-I-G-10.0, WAIT-64.0, MOVE-G-E-36.0, MOVE-E-C-10.0, WAIT-233.0, MOVE-C-A-47.0, MOVE-A-B-45.0, WAIT-130.0, MOVE-B-A-45.0, MOVE-A-C-47.0, MOVE-C-D-5.0, MOVE-D-F-10.0, MOVE-F-E-5.0, MOVE-E-G-36.0, MOVE-G-H-5.0, MOVE-H-J-10.0, MOVE-J-I-5.0, WAIT-16.0, MOVE-I-K-37.0,

FIG. 7

L DEPARTURE: 0

K ARRIVAL 70, DEPARTURE 70

I ARRIVAL 107, DEPARTURE 107

G ARRIVAL 117, DEPARTURE 169

EXAMPLE OF TRAVEL TIMING SCHEDULE

MOBILE OBJECT 1: F (DEPARTURE 0) -> B (ARRIVAL 40, DEPARTURE 40)
 -> C-UnLoad (ARRIVAL 50, DEPARTURE 100)
 -> B (ARRIVAL 110, DEPARTURE 110) -> A (ARRIVAL 130)

MOBILE OBJECT 2: G (DEPARTURE 0) -> D (ARRIVAL 10, DEPARTURE 10)
 -> C (ARRIVAL 20, DEPARTURE 20) -> B (ARRIVAL 30, DEPARTURE 30)
 -> E-UnLoad (ARRIVAL 50)

MOBILE OBJECT 3: A (DEPARTURE 0) -> B (ARRIVAL 35, DEPARTURE 35)
 -> C (ARRIVAL 45, DEPARTURE 45) -> D (ARRIVAL 55, DEPARTURE 55)
 -> G-Load (ARRIVAL 65)

FIG. 9

PASSING ORDER CONSTRAINTS AT REFERENCE NODE B

MOVEMENT COMMAND DATA TO BE TRANSMITTED TO EACH MOBILE OBJECT

MOBILE OBJECT 1 :
    F->B(check)->C-UnLoad->B->A

MOBILE OBJECT 2 :
    G->D->C->B->E-UnLoad

MOBILE OBJECT 3 :
    A-> B(check)->C->D->G-Load

CANDIDATE TO BE USED FOR CHECK
WITH REVERSE RUNNING CONDITIONS/MERGING CONDITIONS

MOBILE OBJECT 1 :

F->B(check)->C(check)-UnLoad->B->A(check)

MOBILE OBJECT 2 :

G->D->C->B->E-UnLoad

MOBILE OBJECT 3 :

A-> B(check)->C(check)->D(check)->G(check)-Load

TRAVEL CONTROL DEVICE, TRAVEL CONTROL METHOD, TRAVEL CONTROL SYSTEM AND COMPUTER PROGRAM

CROSS REFERENCE TO RELATED APPLICATIONS

This application is based upon and claims the benefit of priority from the prior Japanese Patent Application No. 2019-197806, filed on Oct. 30, 2019, the entire contents of which are incorporated herein by reference.

FIELD

Embodiments described herein relate to a travel control device, a travel control method, a travel control system and a computer program.

BACKGROUND

In a case where a plurality of mobile objects are caused to travel at the same time, efficiency as an entire system is low due to collisions among mobile objects, congestion, or the like. A travel control device for causing a plurality of mobile objects to efficiently travel is desired.

BRIEF DESCRIPTION OF THE DRAWINGS

FIG. 7 is a diagram illustrating an example of a travel timing schedule generated by a travel timing scheduler.

FIG. 8 is a diagram illustrating part of a travel plan of a mobile object (AGV 0) in FIG. 7;

FIG. 9 is a diagram for explaining an operation example of a passing order determiner;

DETAILED DESCRIPTION

According to one embodiment, a travel control device includes a passing order determiner configured to determine passing order of a plurality of mobile objects in a first area through which the plurality of mobile objects pass on a basis of a conflict condition at which conflict among the mobile objects occurs; and a controller configured to control traveling of the plurality of mobile objects on a basis of the passing order.

Technical background of the present embodiment will be described. In recent years, along with generalization of high-mix low-volume production, flexibility has been required in production process. For example, respective steps in production line are modularized and freely reassembled, and an AGV (Automatic Guided Vehicle) performs conveyance between the steps. Further, a working mobile robot with an arm is caused to work while moving among a plurality of work areas.

Further, with a serious manpower shortage at a logistics site as background, approaches for saving a manpower are accelerating in distribution centers of online shopping, and the like. For example, the approaches include combination of an AGV or an autonomous traveling forklift, and a picking robot.

Still further, along with development of autonomous driving technology of vehicles, autonomous valet parking in which vehicles are caused to autonomously travel and park at a parking area in an unmanned state has reached practical use. Further, trials for causing an unmanned construction mobile object which is remotely operated at a construction site, a mine, or the like, to travel have reached practical use.

It is difficult to strictly manage traveling of an autonomous traveling mobile object which travels while identifying an own position, with movement time, or the like, and, in some cases, unexpected movement in both directions may occur at an arbitrary position during traveling on a free plane. Deadlock may occur depending on a structure of traveling path.

The present embodiment realizes efficient traveling while preventing occurrence of conflict such as a collision or deadlock among mobile objects in a case where a plurality of mobile objects such as AGVs and mobile robots are caused to travel in a travel area such as on a free plane in this manner. In the present embodiment, as an example, an autonomous traveling mobile object which travels on a free plane while identifying an own position is dealt with as the mobile object. However, the present embodiment can be also applied to a non-autonomous traveling mobile object which travels on a dedicated traveling path such as a rail and a guide tape laid in advance. The present embodiment will be described in detail below.

Embodiments of the present invention will be described below with reference to the drawings.

First Embodiment

Figure 1:
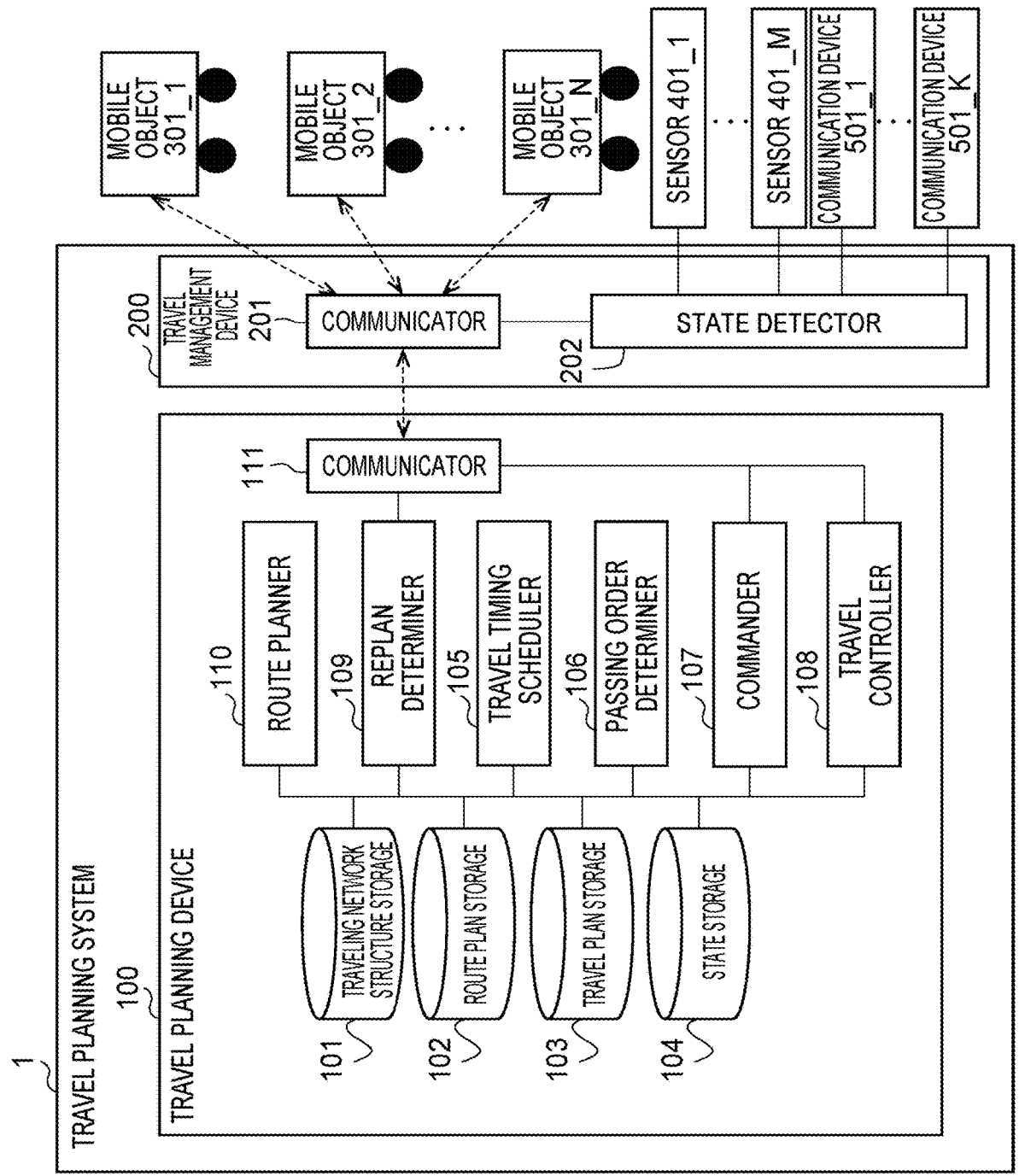
FIG. 1 illustrates an example of an entire system configuration including a travel planning system (travel control system) according to a first embodiment.

FIG. 1 illustrates an example of an entire system configuration including a travel planning system according to a first embodiment. The entire system configuration includes a travel planning system (travel control device) 1, a plurality of mobile objects (or moving vehicles or mobile entities) 301_1 to 301_N, a plurality of sensors 401_1 to 401_M, and a plurality of communication devices 501_1 to 501_K. The travel planning system 1 includes a travel planning device 100 and a travel management device 200. An arbitrary mobile object will be described as a mobile object 301. An arbitrary sensor will be described as a sensor 401. An arbitrary communication device will be described as a communication device 501. The travel planning device 100 or both the travel planning device 100 and the travel management device 200 correspond to the travel control device according to the present embodiment.

The travel planning device 100 and the travel management device 200 may exist on the same computer system. Alternatively, the travel planning device 100 and the travel management device 200 may exist on different computer systems and may be connected to each other via a network.

The mobile objects 301_1 to 301_N are mobile objects such as AGVs (Automatic Guided Vehicles), autonomous mobile robots, and vehicles which travel autonomously (for example, autonomous traveling vehicles) as an example.

The travel planning system 1 controls operation so as to be efficient as a whole so that conflict such as deadlock and a collision does not occur in a case where a plurality of mobile objects travel in a travel area. In the travel area, work areas for mobile objects, shelves in which objects to be worked are stored, carry-in entrances through which objects are carried in and carried out, or the like, may be provided.

Figure 2:
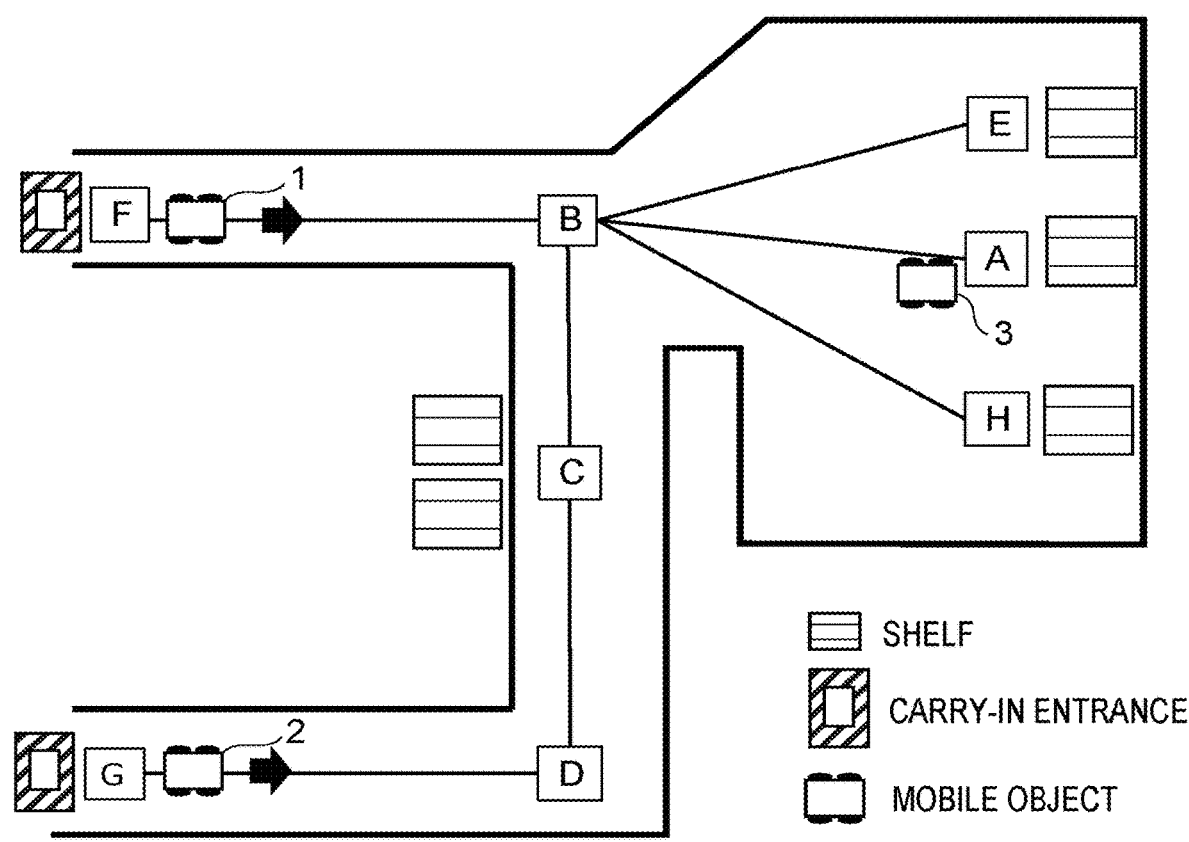
FIG. 2 is a top view schematically illustrating aspect where operation of a plurality of mobile objects is controlled in a travel area on a free plane.

FIG. 2 is a top view schematically illustrating aspect where operation of a plurality of mobile objects is controlled in a travel area as a free plane. A plurality of reference areas which are set in the travel area in association with coordinates on map data on a floor are defined as reference nodes (A to H in FIG. 2). In an example in FIG. 2, reference areas A to H are set in the travel area, and a plurality of reference nodes A to H corresponding to the reference areas A to H are defined as data. The reference areas and the reference nodes are expressed with the same signs.

There is a path (traveling path) of the mobile objects between the reference areas. The travel area includes a plurality of reference areas, and traveling paths between the plurality of reference areas in this manner. In the present embodiment, the travel area will be also referred to as a travel network. A line connecting the reference nodes is defined as a virtual traveling path. The virtual traveling path corresponds to a traveling path between the reference areas corresponding to the reference nodes. In the example in FIG. 2, each virtual traveling path is expressed with a line. However, the virtual traveling path may be a curve or combination of a line and a curve.

A virtual travel network in which the reference nodes are connected to the virtual traveling paths is defined as data in advance. Data of the virtual travel network may be defined on a floor map defined as a drawing such as CAD (Computer-Aided Design) in advance. The data of the virtual travel network may be defined on an environment map which is identified by the mobile object using a self-position detection function. Here, a method for defining the data of the virtual travel network is not particularly limited.

The mobile objects 1, 2 and 3 in FIG. 2 correspond to the mobile object 301 in FIG. 1, and the mobile object itself has an autonomous traveling function. The mobile object has a function of autonomously generating a traffic line on which the mobile object is to move for two reference nodes connected with the virtual traveling path and traveling. Note that the traffic line on which the mobile object is to move may match the virtual traveling path or does not have to match the virtual traveling path. Further, the mobile object may have a function of traveling on the virtual traveling path as a recommended route when the mobile object moves between two reference nodes, and, in a case where the mobile object finds a temporary obstacle on the virtual traveling path, locally avoiding the obstacle.

In a case where the mobile object having a function of avoiding an obstacle passes through a virtual traveling path which has room to avoid an obstacle, it is possible to deal with the virtual traveling path as a virtual traveling path for which interference between the mobile objects can be ignored (virtual traveling path for which it is not necessary to take into account conflict conditions which will be described later). For example, in FIG. 2, a virtual traveling path such as a virtual traveling path BE (virtual traveling path between a reference area B and a reference area E, the same hereinafter), a virtual traveling path BA and a virtual traveling path BH has sufficient room, for example, for the mobile objects to avoid each other, and thus even if two mobile objects travel in directions in which the mobile objects face each other, conflict does not occur. For example, one mobile object waits on the side of the virtual traveling path, and the other mobile object moves on the virtual traveling path. If the other mobile object has passed, the one mobile object restarts movement. Meanwhile, because a traveling path BC does not have room for the mobile objects to avoid each other, if two mobile objects travel on the traveling path in directions in which the mobile objects face each other, conflict such as a collision occurs.

Note that the mobile object can move in an anterior direction, in a posterior direction or in both directions of an anterior direction and a posterior direction. The mobile object may steering travel or may be able to rotate so that an anterior portion and a posterior portion are inverted. Further, the mobile object may be able to move in directions other than the anterior direction and the posterior direction, such as an oblique direction, and the directions are not particularly limited here.

Hereinafter, there is a case where a virtual traveling path for which interference can be ignored in this manner will be referred to as a non-interference traveling path, and a virtual traveling path for which interference cannot be ignored (virtual traveling path for which it is necessary to take into account conflict conditions which will be described later) will be referred to as an interference traveling path. It is assumed that whether the traveling path is a non-interference traveling path or an interference traveling path is defined in advance for the virtual traveling path.

Each mobile object travels in a travel area (travel network) in accordance with operation allocated by the travel planning device 100 under management of the travel planning device 100 in FIG. 1. For example, each mobile object carries package received at a carry-in entrance to another carry-in entrance. There is also a case where each mobile object does work of carrying down package from a shelf or piling up package in midstream of movement. Each mobile object does such work by executing commands included in movement command data provided from the travel planning device 100. Note that there can be a case where the mobile object only moves without conveying package or doing work.

The travel planning device 100 according to the present embodiment generates a route plan indicating a route through which each mobile object should travel. The travel planning device 100 generates a travel timing schedule which determines a timing at which each mobile object travels on each virtual traveling path on the basis of the route plan so that conflict such as a collision or deadlock does not occur at each mobile object. The timing includes at least one of a timing at which a mobile object departs from (or passes through) the reference area, a timing at which the mobile object arrives, or the like.

The travel management device 200 generates a list of reference areas (list of reference nodes) through which each mobile object should pass for each mobile object on the basis of the route plan or the travel timing schedule, and transmits movement command data based on the list. Further, the travel management device 200 specifies a reference area for which it is necessary to determine passing order of a plurality of mobile objects among the reference areas as a management target area (first area) on the basis of the travel timing schedule, and determines the passing order of the plurality of mobile objects in the management target area.

The travel management device 200 controls traveling of the mobile objects so that the respective mobile objects travel in the management target area in accordance with the passing order. By this means, conflict such as a collision among the mobile objects and deadlock is prevented. Passing through or departing from the reference area by the mobile object corresponds to passing through or departing from the reference node by the mobile object on map data. Further, traveling on a real traveling path by the mobile object corresponds to traveling on a virtual traveling path on map data by the mobile object. In the following description, there is also a case where passing through of the reference area by the mobile object will be expressed as passing through the reference node by the mobile object, or traveling on a real traveling path by the mobile object will be expressed as traveling on a virtual traveling path by the mobile object.

A collision and deadlock will be described here. Here, the deadlock is a state where an arbitrary mobile object cannot move to an arbitrary intersection portion (for example, a junction portion or a crossing point) or to an end portion of a traveling path in the travel network. The collision is contact between a mobile object and another mobile object.

Figure 3A:
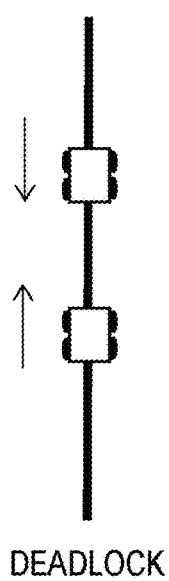
FIGS. 3A and 3B each are a diagram illustrating an example of deadlock and an example of a collision.
Figure 3B:
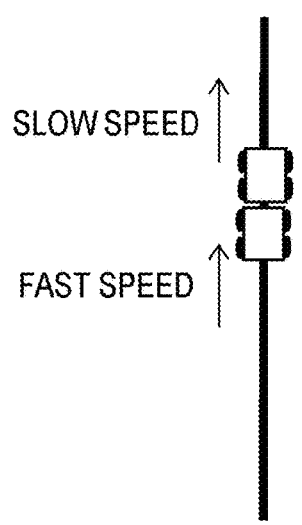

FIG. 3A illustrates an example of the deadlock, and FIG. 3B illustrates an example of the collision. In FIGS. 3A and 3B, the traveling path is expressed with a line for convenience sake. In FIG. 3A, two mobile objects travel in directions reverse to each other on the same traveling path. It is assumed that the two mobile objects can only move forward. In this case, the two mobile objects cannot move to an arbitrary intersection portion or end portion, and deadlock occurs. In FIG. 3B, while two mobile objects travel in the same direction on the same traveling path, because speed of the mobile object which travels behind is higher than speed of the mobile object which travels ahead, the mobile object which travels behind collides with the mobile object which travels ahead.

Occurrence of deadlock or a collision in this manner will be expressed as conflict (or interference) between mobile objects. However, the conflict is not limited to this example. For example, the conflict may be arrival of two mobile objects at an intersection portion (junction portion or crossing point) at the same time. The conflict may be a state where, in a state where one or more mobile objects wait at an intersection portion, another mobile object travels on a traveling path which leads to the intersection portion. Conditions of occurrence of such conflict will be referred to as conflict conditions.

The travel planning system 1 in FIG. 1 realizes efficient operation of each mobile object without causing conflict (such as a collision or deadlock) at each mobile object.

The travel planning device 100 in FIG. 1 includes a traveling network structure storage 101, a route plan storage 102, a travel plan storage 103, a state storage 104, a travel timing scheduler (timing determiner) 105, a passing order determiner 106, a commander 107, a travel controller 108, a replan determiner 109, a route planner 110 and a communicator 111. An input device (for example, a mouse, a keyboard or a touch panel) for a user of the present device 100 to input various kinds of instructions or data may be provided. Further, a display device (for example, a liquid crystal display or an organic electroluminescence display) which displays data within each storage or data generated at each part may be provided in the device 100.

The communicator 111 of the travel planning device 100 performs communication with a communicator 201 of the travel management device 200. Communication between the communicator 111 and the communicator 201 may be wireless communication or wired communication. The communicator 201 of the travel management device 200 performs communication with the communicator 111 of the travel planning device 100 and the mobile object 301. Communication between the communicator 201 and the mobile object 301 is wireless communication. However, wired communication is not excluded. Part or all of the mobile objects 301 may not perform communication with the communicator 201. However, also in this case, the mobile object 301 can perform communication with the communication device 501 (which will be described later) provided on any path side. The mobile object 301 can perform communication with the communication device 501 within a communication possible range of the communication device 501. In a case where the travel planning device 100 and the travel management device 200 are the same device, the communicator 111 may be omitted.

The traveling network structure storage 101 stores information indicating a structure of a travel network (travel area) (traveling network structure information) inside. The traveling network structure information is expressed as a graph structure including, for example, coordinates of a plurality of reference nodes, and a plurality of arcs (virtual traveling paths) connecting between the reference nodes. The graph structure corresponds to a virtual travel network.

Figures 4A, 4B, 4C:
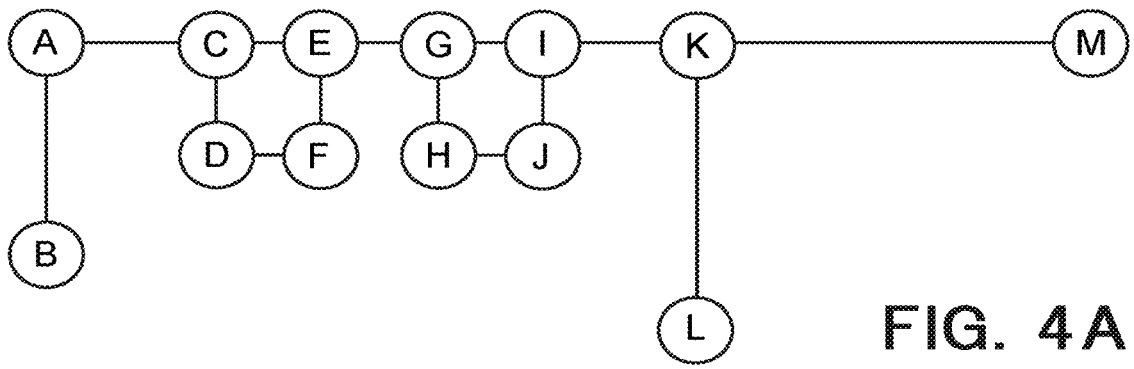
FIGS. 4A to 4C show diagrams illustrating an example of traveling network structure information.

FIGS. 4A to 4C illustrates an example of the traveling network structure information. Each virtual traveling path is expressed with a line coupling between the reference nodes. Each circle in FIG. 4A indicates a reference node, and a line connecting between the circles indicates an arc (virtual traveling path). The reference node corresponds to an end portion of the virtual traveling path, and an intersection portion of the virtual traveling paths as an example. A reference area can be set (a reference node can be set) at an arbitrary portion in the travel network. An arbitrary position such as a position where package is to be piled up or to be carried down, a waiting position, a parking place, and an entrance can be set as the reference area (reference node). As an example, an end portion of the traveling path leading to the intersection portion, an end portion of the traveling path not leading to the intersection portion (dead end of the traveling path) may be set as the reference area. In addition, an arbitrary position of the traveling path (for example, an arbitrary area between both ends of the traveling path) may be set as the reference area. The intersection portion itself may be set as the reference area. The mobile object can pass through the reference area or temporarily stay in the reference area. Examples where the mobile object temporarily stays may include temporary stop for working, temporary stop for waiting until another mobile object passes through the traveling path, stop until the next work occurs while there is no work to be done, waiting for charging, parking of an autonomous driving vehicle, or the like.

FIG. 4B indicates reference node IDs, X coordinates and Y coordinates as detail information of the reference nodes. For example, a coordinate of the reference node A is (X, Y)=(20, 20).

FIG. 4C indicates virtual traveling path IDs, and IDs of reference nodes at both ends of the virtual traveling paths as detail information of the traveling network structure. For example, an ID of a virtual traveling path between the reference nodes A and B is 1, and reference nodes at both ends of the virtual traveling path are A and B. A distance between the reference nodes (distance of the virtual traveling path), a standard movement period length by reference speed of each mobile object may be included in the traveling network structure information in association with the virtual traveling path ID. Alternatively, a distance of the virtual traveling path may be calculated on the basis of positions of the reference nodes at the both ends of the virtual traveling path.

Figures 5A, 5B, 6A, 6B:
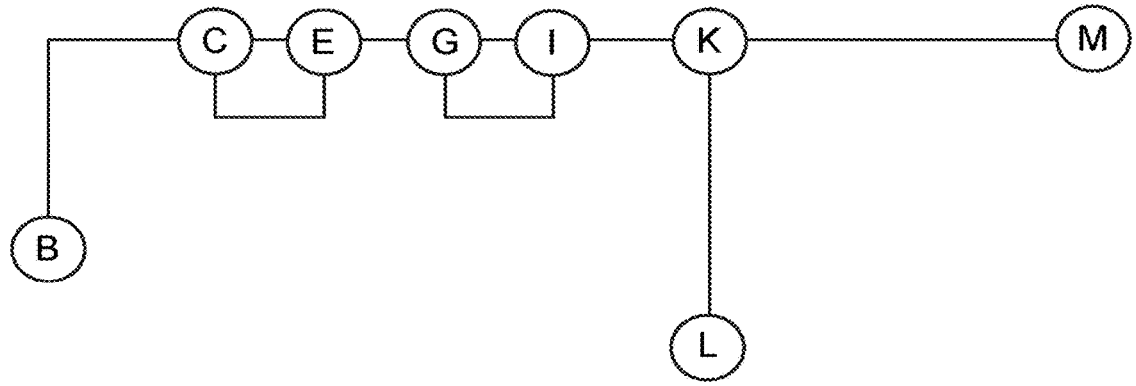
FIGS. 5A and 5B show a diagram illustrating another example of the traveling network structure information.
FIGS. 6A and 6B each are a diagram illustrating an example of a route plan of a certain mobile object.

FIGS. 5A and 5B illustrate another example of the traveling network structure information. FIG. 5A is a diagram in which part of reference nodes is omitted from the traveling network structure information in FIGS. 4A to 4C and only specific reference nodes are left. The specific reference nodes are, for example, reference nodes corresponding to an area such as a position where package is to be piled up or to be carried down and a waiting position.

FIG. 5B illustrates virtual traveling path IDs of the respective virtual traveling paths, IDs of reference nodes at both ends of the virtual traveling paths, and standard times required for traveling on the respective virtual traveling paths (that is, traveling on the traveling paths corresponding to the respective virtual traveling paths). For example, a virtual traveling ID of the virtual traveling path between the reference nodes B and C is 1, the reference nodes at both ends of the virtual traveling path are B and C, and a standard time required for traveling on the virtual traveling path (more specifically, traveling on the traveling path corresponding to the virtual traveling path) is 180. Any time unit may be used. Note that distance information of the virtual traveling path may be provided in place of the standard time.

Information regarding a structure of the virtual traveling path may be stored in the traveling network structure storage 101 in association with the virtual traveling path ID. For example, information indicating whether or not the virtual traveling path is a virtual traveling path on which two mobile objects can avoid conflict (avoid interference such as a collision) may be stored.

The route planner 110 generates a route plan which designates a sequence of reference areas through which each mobile object passes on the basis of information regarding content of work which is to be done by each mobile object and order of the work (operation of each mobile object) determined in advance, and stores data of the generated route plan in the route plan storage 102. While any method for generating a route plan may be employed, as an example, a route plan of each mobile object may be generated so as to reduce a traveling distance in which a plurality of mobile objects travel in reverse directions on the same traveling path, as an evaluation criterion or part of the evaluation criterion. It is also possible to use a route plan which is generated by an external device or which is prepared in advance. In this case, the route planner 110 acquires the route plan and stores the route plan in the route plan storage 102. The route planner 110 may receive data of the route plan from an external device via the communicator 111. The route planner 110 may acquire data of the route plan via an input device operated by the user.

The route plan storage 102 stores data of the route plan of each mobile object inside.

FIG. 6A illustrates an example of a route plan of a certain mobile object. In this example, the mobile object departs from a reference area L in FIG. 4A, goes to a reference area B by way of K, I, G, E, C and A, and, then, goes to a reference area M by way of A, C, D, F, E, G, H, J, I and K, goes to the reference area B again by way of K, I, G, E, C and A, and, further returns to the reference area L by way of A, C, D, F, E, G, H, J, I and K. Here, the reference areas are expressed using IDs of the reference nodes.

The traveling paths in the above-described example include a looped path which goes back and forth in the reference area. This route plan is directed to one mobile object, and route plans are also prepared for other respective mobile objects. Note that the traveling path does not have to be a looped path. The respective mobile objects may travel on different virtual traveling paths over a long period.

In a case of a mobile object directed to conveyance of package, a mobile robot which does various kinds of work while moving, or the like, information of the work may be added to the route plan for the reference area in which work is to be done.

FIG. 6B illustrates an example of the route plan in this case. In this example, information (Load) which gives an instruction to do work of loading package from a shelf in the reference areas L and M and information (Unload) which gives an instruction to do work of unloading package in the reference area B are inserted. Here, Load indicates package loading work, and Unload indicates package unloading work. Note that a direction of work (piling up etc.) to be done for a shelf being working target may be determined in advance or the shelf being working target may be automatically detected by the mobile object using a sensor, or the like. The examples of the direction of work include a left direction, a right direction, an anterior direction and an oblique direction.

The state storage 104 stores information indicating current traveling states of the respective mobile objects and specific information of the mobile objects inside.

The information indicating the traveling states of the mobile objects may include position information of the respective mobile objects, remaining battery levels of batteries mounted on the mobile objects, whether or not the mobile objects have package (in a case where the mobile objects convey package), types and the number of pieces of package which are being conveyed, or the like. The position information includes current positions (positions which are detected most recently) of the mobile objects, and history information of reference nodes or positions which the respective mobile objects have passed through until now. The information indicating the traveling states is acquired by a state detector 202 (which will be described later) of the travel management device 200 as will be described later, or acquired by the travel management device 200 by the mobile object itself detecting and transmitting an own position. In the latter case, there is also a case where the mobile object notifies information indicating the traveling state to the travel management device 200 only when the mobile object passes through the reference node.

The specific information of the mobile objects may include, for example, specification information of the mobile objects, such as standard speed, maximum speed, minimum speed, sizes of the mobile objects and directions in which the mobile objects can move. Further, the information may include a change rate of the standard speed in accordance with the remaining battery levels (for example, as the remaining battery level is lower, the standard speed is set lower). Still further, if the mobile objects are directed to conveyance of package, the information may include information of length of a working period required for carrying down package (for example, a length of period required for piling up or carrying down a predetermined number of pieces of package). The information described here is merely an example, and the information may include other information.

The travel timing scheduler 105 generates a travel timing schedule so that conflict (a collision or deadlock) does not occur for each mobile object which is a planning target under constraint conditions that the route plan of each mobile object is not changed. The travel timing schedule includes information for specifying arrival time, departure time or both of them for each reference area as an example. There are, for example, time of arrival at the reference area, time of departure from the reference area, a length of a period staying in the reference area, a length of period for moving between the reference areas, or the like.

The mobile objects which become targets of planning of the travel timing schedules are all the mobile objects whose operation is managed by the travel management device 200 as an example. The travel timing scheduler 105 uses a route plan of each mobile object and information of each mobile object to generate the travel timing schedule of each mobile object. The information of each mobile object includes information indicating the traveling state and specific information as described before.

Further, the travel timing scheduler 105 regenerates a travel timing schedule of each mobile object in a case where it is determined to regenerate a travel timing schedule by the replan determiner 109 which will be described later. The travel timing schedules generated previously are updated with the regenerated travel timing schedules. Regeneration of the travel timing schedules is performed for route portions or part of the route portions in which the mobile objects have not moved yet among routes indicated in the route plans of the mobile objects. Updated portions of the travel timing schedules correspond to route portions after update positions determined for the mobile objects among the routes of the mobile objects which will be described later.

FIG. 7 illustrates an example of the travel timing schedule generated by the travel timing scheduler 105. An example of travel timing schedules of three mobile objects (AGV 0, AGV 1, AGV 2) is indicated.

"MOVE" is a command (move command) for giving an instruction to move, and has a movement period length as an argument. For example, in the travel timing schedule for the AGV 0, MOVE-K-I-37.0 indicates movement from the reference area K to the reference area I in 37 time units. 37 time units is a movement period length designated as an argument.

"WAIT" is a command (wait command) for giving an instruction to wait in the reference area of the movement destination. For example, in a case where a command of MOVE-I-G-10.0 is continuous with a command of WAIT-52.0, the commands indicate waiting for 52 time units in the reference area G when the mobile object moves from the reference area I to the reference area G. Therefore, in this case, the mobile object moves to the reference area G in 10 time units with MOVE-I-G-10.0, waits for 52 time units there and moves in accordance with the next command. Further, a dummy reference area (dummy reference node) for confirming passing or for waiting may be added to an end portion of a traveling path to be connected to the reference area or a portion near the end portion within the traveling path (that is, an end portion of the virtual traveling path to be connected to the reference node or a portion near the end portion within the virtual traveling path). Each mobile object may autonomously travel using the dummy reference area (dummy reference node) as a target point or a passing point. For example, in a case where a braking distance of a mobile object is long, or the like, by performing control so that the mobile object stops in a dummy reference area before the reference area, it is possible to prevent the mobile object from being unable to stop in the reference area and going too far. The dummy reference area (dummy reference node) may be set while a size and dynamic characteristics of the mobile object are taken into account in this manner.

In the present example, in the route plan of the mobile object AGV 0, a route is designated in which the mobile object departs from the reference area L in FIG. 4A, goes to the reference area B by way of other reference areas, and, then, goes to M by way of other reference areas, goes to B again by way of other reference areas and returns to L by way of other reference areas.

In the route plan of the mobile object AGV 1, a route is designated in which the mobile object repeats twice departing from the reference area B in FIG. 4A, going to the reference area M by way of other reference areas, and returning to the reference area B again by way of other reference areas.

In the route plan of the mobile object AGV 2, a route is designated in which the mobile object departs from the reference area K in FIG. 4A, goes to the reference area B by way of other reference areas, goes to B again by way of other reference areas including the reference area L and returns to the reference area K by way of other reference areas.

The travel timing scheduler 105 generates the travel timing schedules for the AGV 0, the AGV 1 and the AGV 2 as illustrated in FIG. 7 by executing search algorithm which will be described later under conditions that these route plans (see FIGS. 6A and 6B) of the AGV 0, the AGV 1 and the AGV 2 are provided. In these travel timing schedules, arrival time, departure time, or the like, of the AGV 0, the AGV 1 and the AGV 2 for each reference area is adjusted so as not to cause conflict (such as a collision or deadlock).

The travel timing scheduler 105 may assume that the mobile objects move at the standard speed for each virtual traveling path in the traveling network structure information in FIG. 4 in order to calculate a movement period length designated as the argument in the MOVE command. A standard period length for the virtual traveling path may be provided in advance as in the traveling network structure information in FIG. 5 in view of a case where speed of the mobile object changes from the standard speed in accordance with a curvature, inclination, or the like, of the virtual traveling path. In this case, the mobile objects may autonomously control movement speed between maximum speed and minimum speed so as to be able to move in the standard period. Further, there can be a case where the standard speed may be corrected by change rates provided in accordance with the remaining battery levels. Still further, if the mobile objects are directed to conveyance of package, the standard speed may be corrected to faster or slower while the mobile objects convey package. Further, the standard period length during which the mobile objects travel on each virtual traveling path may be corrected on the basis of traveling result data. The travel timing scheduler 105 calculates a movement period length so as to satisfy conditions regarding speed as stated in the above.

The travel timing scheduler 105 generates traveling timing schedules while reflecting information of a working period length required for carrying down package for mobile objects which are directed to conveyance of package or mobile robots which do various kinds of work including carrying down of package. As indicated in the above-described route plan (see FIG. 6B), content of work to be done in the reference area may be designated. Further, content of work to be done by the mobile objects in the reference area may be determined in advance in accordance with pairs of the reference areas and types of mobile objects.

In the example of the traveling timing schedules illustrated in FIG. 7, it is assumed that it takes 40 time units to pile up package in the reference areas M and L, and it takes 130 time units to carry down package in the reference area B. Values depending on types and the number of pieces of package, or types of mobile objects are provided in advance as working period lengths for piling up and carrying down of package. These values may be stored in the state storage 104 or may be provided to the route plans. Further, the working period lengths may be corrected on the basis of the traveling result data. A command which instructs the mobile objects to do the wok may be provided in the traveling timing schedules for the reference area where the work is to be done. Alternatively, such an instruction command may be embedded in advance as a program code inside the mobile objects.

While a format of the traveling timing schedules illustrated in FIG. 7 is a format in which commands for the mobile objects are lined up, the format is merely an example. A format of the traveling timing schedules is not particularly limited. The traveling timing schedules only have to include information from which time at which the mobile objects should arrive and time at which the mobile objects should depart can be specified for part of the reference areas or all the reference areas in the route plans of the respective mobile objects.

The travel timing scheduler 105 generates a travel plan of each mobile object on the basis of the travel timing schedule of each mobile object and the route plan of each mobile object. Specifically, the travel timing scheduler 105 generates a travel plan of each mobile object by setting, for part or all of the reference areas in the route plan of the mobile object, information from which time at which the mobile object should arrive and time at which the mobile object should depart can be specified.

The travel plan storage 103 stores inside travel plans of the respective mobile objects generated by the travel timing scheduler 105, and travel order plans indicating passing order of the mobile objects at each reference node determined by the passing order determiner 106 which will be described later.

FIG. 8 illustrates part of a travel plan of the mobile object (AGV 0) in FIG. 7. Time information (arrival time, departure time (passing time)) of the travel timing schedule of the AGV 0 in FIG. 7 is provided to the route plan in FIG. 6. The AGV 0 departs from the reference area L at time 0, arrives at the reference area K at time 70, departs without stopping (that is, passing through the reference area K at time 70), passes through the reference area I at time 107, arrives at the reference area G at time 117, waits there in 52 time units, and departs at time 169. A format of the travel plan illustrated in FIG. 8 is merely an example, and the format is not particularly limited. For example, the travel plan may be a plan in which the travel timing schedule is merely associated with the route plan.

The commander 107 transmits movement command data based on the travel timing schedule of each mobile object determined by the travel timing scheduler 105 to the travel management device 200 via the communicator 111. The travel management device 200 receives the movement command data of each mobile object from the communicator 111 of the travel planning device 100 via the communicator 201 and transmits the movement command data to each mobile object.

As a form of movement command data to be transmitted to each mobile object, the movement command data includes a command to move to each reference node included in the route plan (including a command to work in a case where work is to be done at the reference node or near the reference node), and passing check necessity information (which will be described later) to be provided to each reference node included in the route plan. As a command to move to each reference node included in the route plan, it is also possible to use a command obtained by eliminating time from the command included in the travel timing schedule. As illustrated in FIGS. 6A and 6B, the route plan includes information indicating a sequence (permutation) of reference nodes through which each mobile object should pass, or at which each mobile object should stop or work. The passing check necessity information is information indicating whether or not it is necessary to make an inquiry to the travel planning system 1 side about allowance of passing before the mobile object enters or passes through (hereinafter, described as passing through) an area (reference area) of the reference node. The passing check necessity information is generated by the passing order determiner 106 on the basis of the travel timing schedule for a reference node for which it is necessary to manage passing order.

The passing order determiner 106 extracts reference nodes for which it is necessary to manage passing order on the basis of the travel timing schedule. The commander 107 adds the passing check necessity information to the command to move to the reference node. The travel controller 108 judges whether to allow passing on the basis of the travel order plan when an inquiry as to whether passing through an area of the reference node (reference area) is allowed is made from the mobile object. In a case where passing is allowed, an allowance notification which allows passing is transmitted to the mobile object as a response. In a case where passing is not allowed, a notification of non-allowance is transmitted as a response. In a case of non-allowance, the mobile object temporarily waits before the reference area, and repeats inquiry as to whether passing is allowed at regular intervals until passing is allowed or temporarily waits before the reference area until a notification of allowance of passing is received from the travel controller 108. The travel controller 108 manages order of the respective mobile objects passing through the reference node to which the passing check necessity information is provided.

An operation example of the passing order determiner 106 will be described using FIG. 9 on the basis of the virtual travel network in FIG. 2.

FIG. 9 illustrates an example of the travel timing schedules of the mobile objects 1 to 3. Here, the following work of the mobile objects 1 to 3 is scheduled. That is, after the mobile object 1 carries down package loaded at a carry-in entrance F, at a shelf C, the mobile object 1 moves to a shelf A and waits. After the mobile object 2 carries down package loaded at a carry-in entrance G, at a shelf E, the mobile object 2 waits. The mobile object 3 moves to the carry-in entrance G and loads package. In the present example, symbols such as A, B and C are commands to move to the reference nodes indicated with the symbols. The command includes arrival time and departure time. The command is executed so that the mobile object arrives at the arrival time, and the next command is executed at the departure time.

The passing order determiner 106 specifies a reference node (node to be managed) for which it is necessary to manage passing order among reference areas (reference nodes) through which two or more mobile objects commonly pass from the travel timing schedules of the mobile objects 1 to 3, and a mobile object for which it is necessary to control passing order through passing allowance of the node. An area corresponding to the node to be managed will be referred to as a management target area. Details of the operation will be described later. Here, for example, the reference node B is specified. Passing order of a plurality of mobile objects at the node to be managed is determined in order of earlier arrival time of the mobile objects at the specified reference node. The determined passing order functions as passing order constraints of the node to be managed. As an example, the arrival time of the mobile object 1 at the reference node B is 0, the arrival time of the mobile object 2 is 10, and the arrival time of the mobile object 3 is 35. If the passing order is determined in order of earlier arrival time, the order becomes the mobile objects 2, 1 and 3. This order becomes passing order constraints of the reference node (node to be managed) B.

Figures 10, 11:
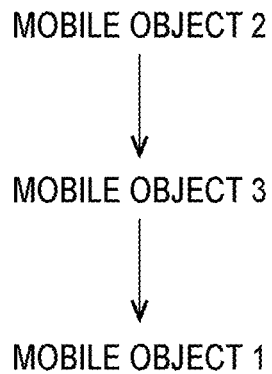
FIG. 10 illustrates an example of passing order constraints for a reference node B.
FIG. 11 illustrates movement command data to be transmitted to mobile objects 1 to 3.

FIG. 10 illustrates an example of the passing order constraints for the reference node B. It is determined that the mobile objects 2, 3 and 1 need to pass through the reference node B in this order.

The commander 107 eliminates information of time from a plurality of commands included in the travel timing schedules of the respective mobile objects. Further, passing check necessity information (for example, "check") is added to part of the command to move to the node to be managed among the plurality of commands. By this means, the movement command data of each mobile object is generated.

In other words, commands to move to a plurality of reference nodes included in the route plan of each mobile object are generated (in a case where work is associated with the reference node, a command to do the work is generated in relation to the command to move to the reference node), and the generated commands are disposed in order of the plurality of reference nodes. Then, passing check necessity information is added to the commands to move to the node to be managed, which are issued to mobile objects for which it is necessary to control passing order of the node to be managed through passing allowance. By this means, movement command data of each mobile object is generated.

FIG. 11 illustrates the movement command data to be transmitted to the mobile objects 1 to 3. In an example in FIG. 11, passing check necessity information (for example, "check") is added to the command to move to the reference node B which is the node to be managed. The command to move to the reference node to which check is added gives an instruction to transmit inquiry data (passing check request) as to whether it is allowed to pass through the reference node to the travel planning system 1 before the mobile object passes through the reference node. For example, the mobile object 1 needs to transmit inquiry data as to whether passing is allowed to the travel planning system 1 after the mobile object 1 departs from the reference node F and before the mobile object 1 passes through the reference node B.

Information of the passing order (travel order plan) of the node to be managed, acquired by the passing order determiner 106 is held in the route plan storage 102 or the travel plan storage 103.

In a case where the travel controller 108 receives a passing check request for the node to be managed from the mobile object, the travel controller 108 determines whether to allow passing through the node to be managed on the basis of passing order and passing history of respective reference nodes (at least passing history of the node to be managed) stored in the state storage 104. If, in the passing order constraints, a mobile object which requires to pass through the node to be managed prior to the mobile object has passed through the node to be managed, the travel controller 108 allows passing of the mobile object which requests passing, and if the mobile object which requires to pass through the node to be managed prior to the mobile object has not passed through the node to be managed, the travel controller 108 does not allow passing.

In the example of the passing order in FIG. 10, in a case where the passing check request of the reference node B is received from the mobile object 1, if the mobile object 3 which should pass through the reference node B immediately prior to the mobile object 1 has passed through the reference node B, it is determined to allow passing, while, if the mobile object 3 which should pass through the reference node B immediately prior to the mobile object 1 has not passed through the reference node B, it is determined not to allow passing. In a case where all the mobile objects (in the present example, the mobile object 2 and the mobile object 3) which should pass through the reference node B prior to the mobile object 1 have passed through the reference node B, it may be determined to allow passing, while in a case where all the mobile objects which should pass through the reference node B prior to the mobile object 1 have not passed through the reference node B, it may be determined not to allow passing.

The travel controller 108 transmits a passing allowance notification to the mobile object which has made the inquiry as a response in a case where passing is allowed. In a case where passing is not allowed, the travel controller 108 transmits a non-allowance notification to the mobile object which has made the inquiry as a response.

In a case where an allowance notification is received, the mobile object passes through the node to be managed, while, in a case where a non-allowance notification is received, the mobile object does not pass through the node to be managed (does not enter the node to be managed). For example, the mobile object temporarily waits at a position different from the node to be managed. Examples of the position different from the node to be managed can include a position immediately before (short of) the node to be managed, a position a fixed distance before the node to be managed, or other positions. As a specific example, in a case where the node to be managed is an intersection portion, the mobile object may wait at an end portion of the traveling path before the intersection portion. Alternatively, in a case where the mobile object does not arrive at the node to be managed yet, the mobile object may decelerate so that arrival at the node to be managed is delayed. By this means, it is possible to increase a possibility that the mobile object can pass through the node to be managed without stopping at the node to be managed.

The travel controller 108 may include an instruction of operation to be performed by the mobile object in the non-allowance notification to be transmitted to the mobile object. For example, an instruction to wait a fixed distance before the node to be managed may be included in the non-allowance notification.

The mobile object temporarily waits before the reference area until receiving the allowance notification. Alternatively, the mobile object may periodically transmit a passing check request. The travel controller 108 judges whether to allow passing of the node to be managed every time the passing check request is received. At a time point at which it is determined to allow passing, the travel controller 108 transmits an allowance notification to the mobile object.

The node to be managed will be described here. The passing order determiner 106 specifies only a reference node for which it is necessary to prevent conflict among reference nodes through which a plurality of mobile objects are scheduled to commonly pass, and mobile objects for which it is necessary to control passing order through passing allowance for the reference node, and sets the specified reference node as the node to be managed. Further, the passing order determiner 106 instructs the specified mobile objects to make passing check requests when the specified mobile objects pass through the node to be managed. For example, in the example in FIG. 9, while two or more mobile objects pass through all the reference nodes other than the reference nodes E and H (departure from a departure point, and arrival at a destination point are also dealt with as passing), only if passing order of the reference node B is managed, the passing order of other reference nodes is as indicated in the travel timing schedule. Therefore, unexpected conflict (such as, for example, deadlock and delay due to waiting for work) does not occur. For example, in the example in FIG. 9, unless the mobile object 2 and the mobile object 3 are caused to pass through the reference node C before the mobile object 1 carries down package at the reference node C and starts work, timings of movement and work determined in the travel timing schedule are delayed, and entire efficiency largely degrades. Further, in a case where the mobile object 3 cannot move backward unless the mobile object 3 is caused to pass through the reference node B before the mobile object 1 enters a narrow path (traveling path) of B-C-D-G, deadlock occurs. By setting the reference node B as the node to be managed and providing constraints at passing order of the mobile objects 1 to 3, it is possible to prevent a problem of such conflict and degradation of efficiency. While only the reference nodes required for preventing conflict are set as the nodes to be managed, it is also possible to set all the reference nodes through which a plurality of mobile objects commonly travel as the nodes to be managed. Also in this case, it is possible to prevent a problem such as conflict for similar reasons. However, processing of controlling passing order of the nodes to be managed increases in accordance with increase in the number of nodes to be managed.

Figure 12A:
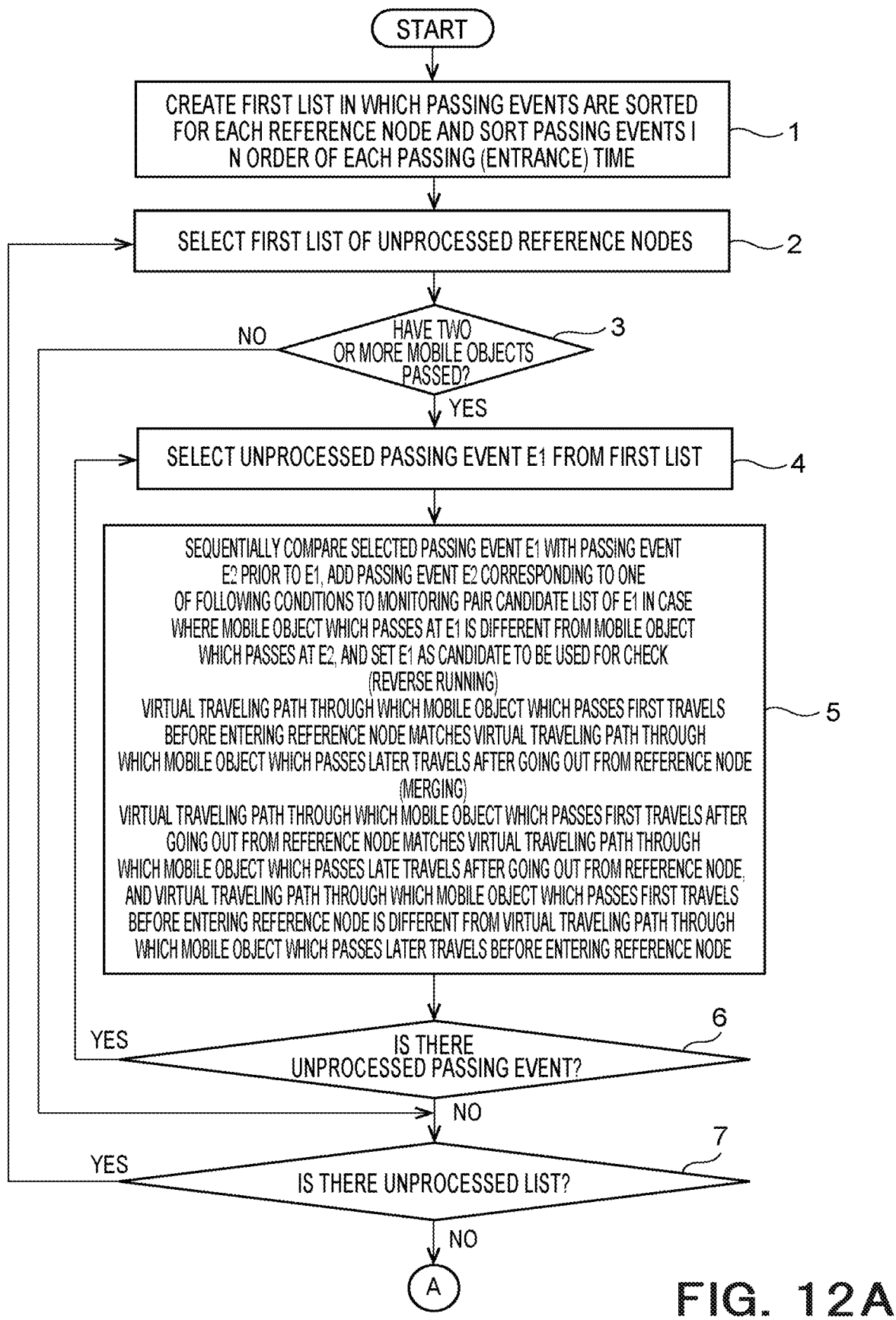
FIG. 12A is a flowchart of processing of specifying a node to be managed by the passing order determiner.
Figure 12B:
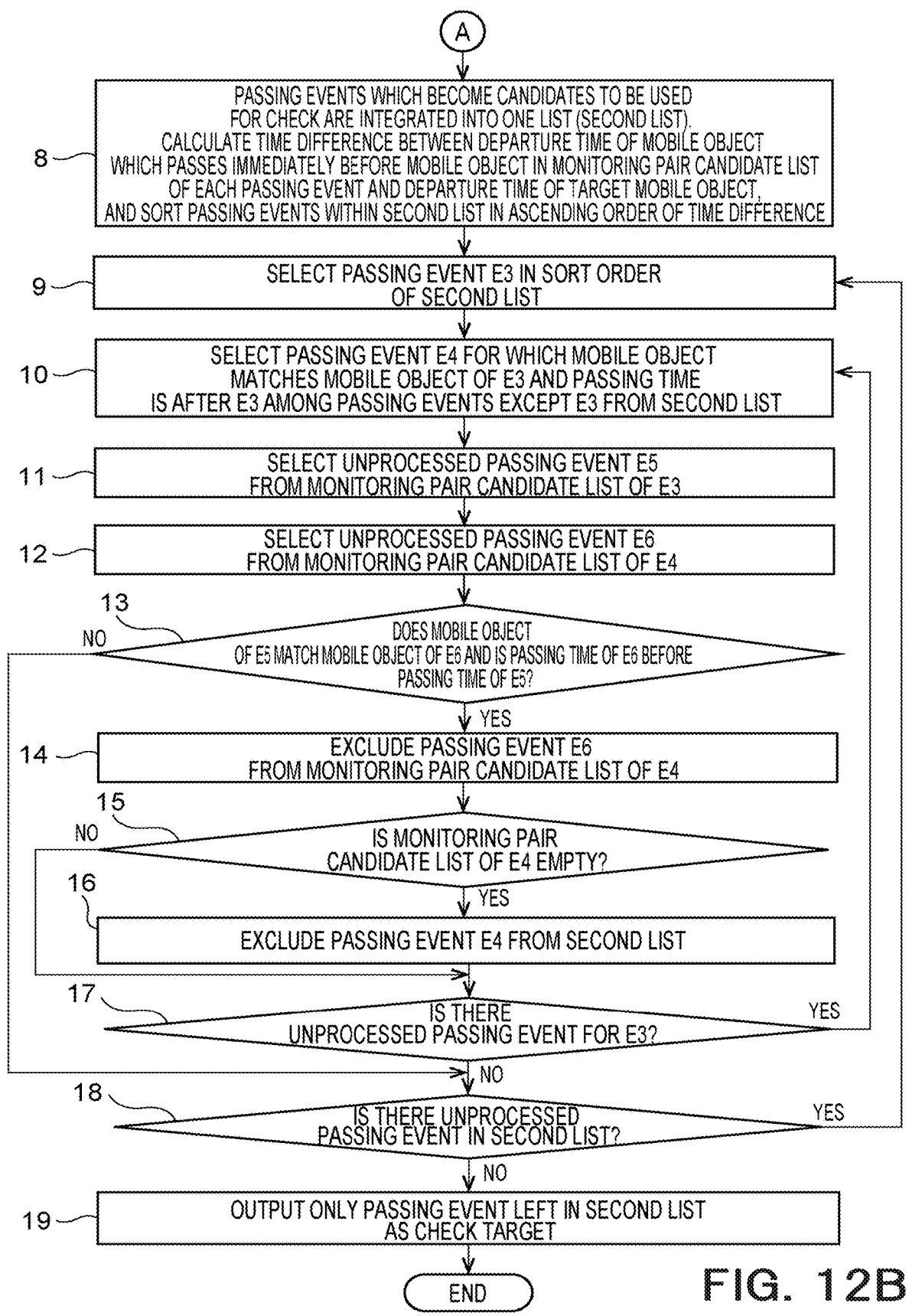
FIG. 12B is a flowchart which is continuation of FIG. 12A.

FIG. 12A and FIG. 12B illustrate flowcharts of an example of processing of specifying the nodes to be managed by the passing order determiner 106.

First, a first list in which passing events of mobile objects (target mobile objects) which pass through the reference node are stored is generated for each reference node on the basis of the travel timing schedule of each mobile object (step 1). The passing events included in the first list are sorted in order of passing time (in order of departure time) for each reference node. As a modified example, it is also possible to sort the passing events in order of arrival time instead of in order of passing time.

Here, the passing event is a data set indicating an event of the mobile object passing through the reference node. Specifically, the passing event includes the following items.

(i) an ID of the reference node
(ii) an ID of the mobile object (target mobile object)
(iii) passing time (departure time)
(iv) an ID of the virtual traveling path through which the target mobile object travels before passing through the reference node, and an ID of the virtual traveling path through which the target mobile object travels after passing through the reference node
(v) an ID of the virtual traveling path through which another mobile object (preceding mobile object) which passes through the reference node prior to this passing event, travels before passing through the reference node, and an ID of the virtual traveling path through which the other mobile object travels after passing through the reference node
(vi) an ID of the passing event of another mobile object (preceding mobile object) which passes through the reference node prior to this passing event for the reference node. The passing event of (vi) is a passing event which may cause conflict with the passing event of (i).

Hereinafter, a set of the passing events of (vi) will be referred to as a monitoring pair candidate list. At a time point of step 1, the monitoring pair candidate list is empty.

These items are an example, and other items may be included, or part of the items does not have to exist.

Next, the first list corresponding to unprocessed reference nodes is selected among the first list for each reference node (step 2).

It is judged whether two or more mobile objects pass through the reference node corresponding to the selected first list, from the passing events within the first list (step 3). In a case of a reference node through which the mobile object does not pass or a reference node through which only one mobile object passes (step 3: No), the processing proceeds to step 7 while the selected first list is excluded from the processing target. In step 7, it is judged whether a first list which has not been selected yet exists, and in a case where the first list exists (step 7: Yes), the processing returns to step 2, and the first list corresponding to the unprocessed reference nodes is selected. In a case of a reference node through which two or more mobile objects pass (step 3: Yes), the processing proceeds to step 4.

In step 4, an unprocessed passing event (which will be referred to as E1) is selected from the selected first list.

In step 5, a passing event (which will be referred to as E2) which satisfies one of reverse running conditions and merging conditions among the passing events which occur temporally prior to the passing event E1 within the selected first list is found, and the passing event E2 is added to the monitoring pair candidate list of the passing event E1.

The reverse running conditions are conditions that the virtual traveling path through which the mobile object (preceding mobile object) which passes through the reference node first travels before passing through the reference node matches the virtual traveling path through which the mobile object (target mobile object) which passes through the reference node later travels after passing through the reference node. In a case where the reverse running conditions are satisfied, it means that there is a possibility that reverse running of the two mobile objects may occur depending on timings at which the mobile objects pass through the reference node. Reverse running is a state where the mobile objects travel on the same traveling path (virtual traveling path) at the same time in directions reverse to each other. As a result of reverse running, deadlock, a collision, or the like, occurs depending on a structure of the traveling path.

That is, in the reverse running conditions, it is determined that reverse running can occur in a case where a first mobile object and a second mobile object which travel in reverse directions on the traveling path leading to a first area exist. In this case, it is necessary to check whether a command to make an inquiry as to allowance of passing of the first area located at both ends of the traveling path is required to be issued to at least one of the first mobile object and the second mobile object.

The merging conditions include the following condition A and condition B, and in a case where both the condition A and the condition B are satisfied, the merging conditions are satisfied.

The condition A is a condition that the virtual traveling path through which the mobile object (preceding mobile object) which passes through the reference node first travels after passing through the reference node matches the virtual traveling path through which the mobile object (target mobile object) which passes through the reference node later travels after passing through the reference node.

The condition B is a condition that the virtual traveling path through which the mobile object (preceding mobile object) which passes through the reference node first travels before passing through the reference node is different from the virtual traveling path through which the mobile object (target mobile object) which passes through the reference node later travels before passing through the reference node.

In a case where the merging conditions are satisfied, it means that there is a possibility that the two mobile objects merge at the reference node depending on timings at which the mobile objects pass through the reference node. Merging is a state where the two mobile objects pass through the reference node at the same time. There is a case where a collision, or the like, occurs as a result of merging depending on a structure of the traveling path. Further, if the mobile objects pass through the reference node in order different from the passing order planned first as a result of merging, the passing order cannot be returned to original order on the subsequent virtual traveling path, and as a result, there is a possibility that conflict may occur. Therefore, it is necessary to check the passing order of the reference nodes upon merging.

That is, in the merging conditions, it is determined that, in a case where there exist the first to the third traveling paths leading to the first area, and there exist the first mobile object and the second mobile object which enter the third traveling path from the first and the second traveling paths by way of the first area, merging can occur. In this case, it is necessary to check whether a command to make an inquiry as to allowance of passing of the first area is required for at least a mobile object which passes through the first area later among the first mobile object and the second mobile object.

While both the reverse running conditions and the merging conditions are judged, there can be a case where only the reverse running conditions are judged.

In a case where there exists at least one passing event which satisfies one of the reverse running conditions and the merging conditions among the passing events which occur temporally prior to the passing event E1 within the first list, the passing event E1 is set as a candidate to be used to check the passing order. That is, the command to move to the reference node, which is to be issued to the target mobile object, is set as a candidate to which passing check necessity information ("check" described above) is added.

The processing proceeds to step 6, and processing from step 4 to step 6 is repeated until there is no unprocessed passing event left in the selected first list.

Further, the processing proceeds to step 7, and processing from step 2 to step 7 is repeated until there is no first list corresponding to the unprocessed reference nodes left.

Figures 13, 14:
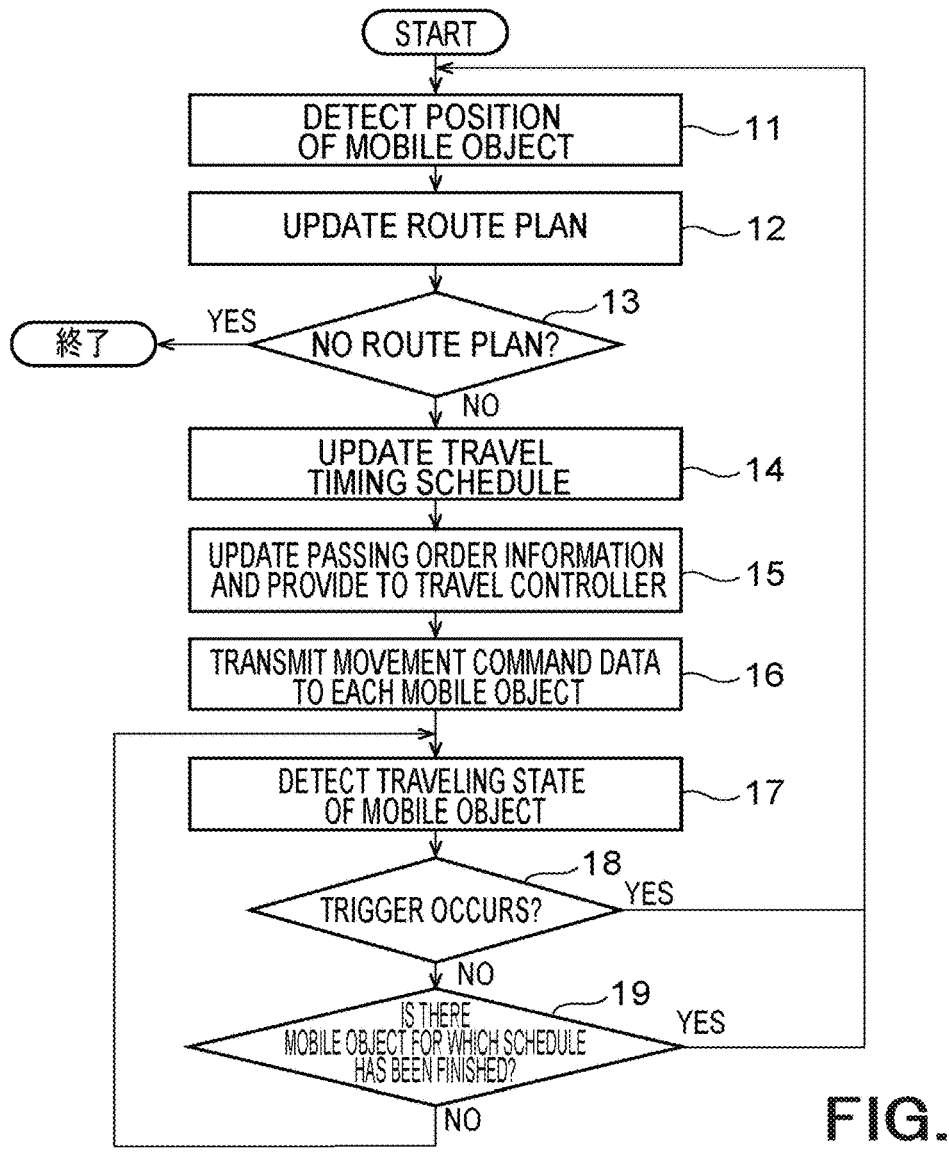
FIG. 13 illustrates an example where passing check necessity information is provided to a command which becomes a candidate for a command to which the passing check necessity information is to be provided.
FIG. 14 is a flowchart of overall operation of the travel planning system.

FIG. 13 illustrates an example where processing to step 5 in the example in FIG. 9 is performed, and passing check necessity information is provided to the command which becomes a candidate to which the passing check necessity information is to be added. Because the reverse running conditions are satisfied for most of the reference nodes, it can be known that there are many reference nodes for which the passing check necessity information is provided for the mobile objects other than the mobile object 2 which passes through the reference node first. For example, concerning the reference node C, because the mobile object 3 passes through the reference node C after the mobile object 2, and the reverse running conditions are satisfied, passing check necessity information is provided to a command to move to the reference node C for the mobile object 3. In a similar manner, because the mobile object 1 passes through the reference node C after the mobile object 3, and the reverse running conditions are satisfied, passing check necessity information is provided to a command to move to the reference node C for the mobile object 1.

Next, from step 8 to step 18 in FIG. 12B, a passing event for which check is not required because check becomes redundant with respect to check of other passing events among the passing events specified as candidates to be used to check the passing order, is specified. The specified passing event is excluded from the candidates to be used to check the passing order. By this means, the candidates to be used to check the passing order are narrowed down.

Referring to the example in FIG. 9, if it can be confirmed that the mobile object 3 passes through (departs from) the reference node B after the mobile object 2, because the mobile object 2 is supposed to pass through the reference nodes C and D before the reference node B, it is not necessary to check the passing order at the reference nodes C and D thereafter.

When the mobile object for which it is necessary to check the passing order passes through the reference node, a time loss occurs due to temporary stop or communication for obtaining approval of passing from the travel planning system 1 side. Therefore, it is desirable that the number of passing events which are candidates to be used to check the passing order is as small as possible.

Specifically, first, all the passing events which become candidates to be used to check the passing order are stored in one list (second list). Then, the passing events within the second list are sorted. Specifically, a time difference between the departure time of the mobile object (immediately preceding mobile object) which has passed immediately before the mobile object within the monitoring pair candidate list of the respective passing events and the departure time of the target mobile object is calculated, and the passing events within the second list are sorted in ascending order of the time difference (step 8).

The passing events (which will be referred to as E3) are selected from the second list as processing targets in sort order (in ascending order of the above-described time difference) (step 9).

Next, a passing event (which will be referred to as E4) which is later than the selected passing event E3 in the second list and for which the mobile object matches that of E3, and for which passing time is after passing time of E3 is sequentially selected as a passing event to be compared (step 10).

Next, the monitoring pair candidate list of the selected passing event E3 is compared with the monitoring pair candidate list of the passing event E4, and a passing event for which it is not necessary to check the passing order is specified by passing being checked at the passing event E3. The specified passing event is excluded from the monitoring pair candidate list of the passing event E4.

Specifically, an unprocessed passing event (which will be referred to as E5) is selected from the monitoring pair candidate list of the passing event E3 (step 11), and an unprocessed passing event (which will be referred to as E6) is selected from the monitoring pair candidate list of the passing event E4 (step 12). It is determined whether or not conditions that the mobile object of the passing event E5 matches the mobile object of the passing event E6, and the passing time of the passing event E6 is before the passing time of the passing event E5, are satisfied (step 13). In a case where the conditions in step 13 are satisfied, the passing event E6 is excluded from the monitoring pair candidate list of the passing event E4 (step 14). It is determined whether or not the monitoring pair candidate list of the passing event E4 becomes empty (step 15), and, in a case where the monitoring pair candidate list of the passing event E4 becomes empty, it is judged that the passing event E4 becomes completely unnecessary to be checked, and the passing event E4 is excluded from the second list (step 16). In this case, the passing event E4 does not become a processing target from step 9 to step 16.

In a case where the conditions in step 13 are not satisfied, or in a case where the monitoring pair candidate list does not become empty in step 15, the processing proceeds to step 17. The processing from step 10 to step 17 is repeated until there is no passing event left for which processing of comparison with E3 has not been performed among the passing events which are later than the passing event E3 in the second list (step 17).

Further, processing from step 9 to step 18 is repeated until there is no unprocessed passing event left in the second list (step 18).

Finally, the passing events left in the second list are set as passing events to be checked. That is, passing check necessity information ("check" described above is provided) is added to commands to move to the reference nodes corresponding to the passing events, which are to be issued to the target mobile objects included in the passing events to be checked.

As an example, in the above-described flow, when the passing time at which the first mobile object passes through the reference node C is earlier than the passing time at which the first mobile object passes through the reference node B, the passing time at which the second mobile object passes through the reference node C is later than the passing time at which the second mobile object passes through the reference node B, the passing time at which the first mobile object passes through the reference node C is earlier than the passing time at which the second mobile object passes through the reference node C, and the passing time at which the first mobile object passes through the reference node B is earlier than the passing time at which the second mobile object passes through the reference node B, it is determined whether a command to make an inquiry as to whether passing of the reference node C is allowed is required to be issued to the second mobile object by utilizing a fact that it is not necessary to confirm whether or not the first mobile object passes through the reference node C before the second mobile object passes through the reference node C.

The replan determiner 109 determines whether or not to perform replan by comparing a travel plan stored in the travel plan storage 103 with a traveling state of the mobile object detected by the state detector 202. Replan means update of the travel plan, that is, update of at least the travel timing schedule among the route plan and the travel timing schedule.

As an example of a position of the mobile object for which a plan is to be updated (update position), the update position may be an arbitrary position if each mobile object can perform communication with the travel management device 200 in real time via the communicator 201. The arbitrary position includes, for example, a current position of the mobile object, or a position at time after a certain margin is added to the current position in view of a time length required for calculation.

If the mobile objects can perform communication with the travel management device 200 only via the communication device 501 disposed in the reference area or near the reference area, the reference area or a position near the reference area may be set as the update position. The communication device 501 may be disposed in midstream of the traveling path instead of being disposed in the reference area or near the reference area. The update position does not have to be the reference area or a position near the reference area if the position is within a range where communication with the communication device 501 is possible. In a case where there is a possibility that the mobile object may hinder traveling of another mobile object by stopping in midstream of the traveling path (for example, a possibility that the mobile object may collide with a mobile object which comes from behind), a position immediately before the reference area to which the mobile object currently heads may be as the update position.

The route planner 110 generates a route plan starting from the update position of each mobile object for each mobile object in a case where it is determined by the replan determiner 109 to perform replan.

As an example, a plan for a route portion after the update position in the current route plan is set as is as the updated route plan. That is, a route plan portion on which the mobile object has not moved yet is specified among the route indicated in the route plan of the mobile object, and the specified portion is set as the updated route plan. For example, in the current route plan is a route plan in FIG. 6A, it is assumed that the current position of the mobile object is a reference area E, and the next movement destination is a reference area C. In this case, a route plan portion on which the mobile object has not moved (updated route plan) becomes as follows by removing first four reference nodes L, K, I and G in FIG. 6A.

(Updated Route Plan)

E, C, A, B, A, C, D, F, E, G, H, J, I, K, M, K, I, G, E, C, A, B, A, C, D, F, E, G, H, J, I, K, L, K, I, G, E,

Alternatively, as another example, in a case where it is determined by the replan determiner 109 to perform replan, the route planner 110 may generate a route plan of each mobile object. Here, the replan is performed so as to reduce a sum of distances of traveling paths (traveling sections) on which a plurality of mobile objects travel in reverse directions at the same time where the sum of distances is used as an evaluation criterion or part of the evaluation criterion. At this time, information of a current position of each mobile object or an update position of each mobile object is used.

Alternatively, as still another example, in a case where a plurality of options for the route plan which can be utilized are provided in advance in accordance with a current position of each mobile object and content of work to be done by each mobile object, one of the options may be selected on the basis of the update position of each mobile object and content of each remaining work. In addition, there is also a method in which a new route plan is generated using algorithm provided in advance. The update method of the route plan is not particularly limited here, and existing route planning methods may be used.

The travel timing scheduler 105 regenerates (updates) the travel timing schedule on the basis of the updated route plan. The travel timing scheduler 105 regenerates the travel plan by providing time information (such as at least one of the departure time and the arrival time) for each reference area (reference node) in the updated travel timing schedule to the updated route plan. The travel timing scheduler 105 updates the travel plan in the travel plan storage 103 with the regenerated travel plan.

The commander 107 generates the movement command data based on the updated timing schedule and transmits the generated movement command data to the travel management device 200. The travel management device 200 transmits the movement command data to each mobile object when each mobile object exists at the update position.

The travel management device 200 performs management for causing each mobile object to travel and management for the traveling state of each mobile object in accordance with the movement command data of each mobile object received from the travel planning device 100.

The communicator 201 of the travel management device 200 performs communication with the mobile objects 301_1 to 301_N and the travel planning device 100. Communication may be either wireless communication or wired communication.

The state detector 202 acquires position information of the own mobile object estimated by the mobile object which has a function of performing self-position estimation via the communicator 201 or the communication device 501. Examples of the self-position estimation may include estimation using means such as dead reckoning, SLAM and GPS. The communication device 501 is a device which wirelessly communicates with the mobile object in a shorter distance than that of the communicator 201. The communication device 501 is disposed, for example, at a position on the traveling path where temporary stop is likely to occur. The specific position is a reference area or an area near the reference area as an example. The state detector 202 may acquire information such as time at which each mobile object passes through the reference area, a traveling direction of each mobile object, and whether or not each mobile object holds package (in a case where each mobile object conveys package) as information of the traveling state other than the position of the mobile object.

Further, markers for position detection such as wireless tags and barcodes may be provided at specific positions where the mobile objects are likely to pass. The specific positions are reference areas or areas near the reference areas as an example. In this case, by the mobile objects detecting the markers, the mobile objects themselves can detect arrival at or passing through the positions. The mobile objects transmit the detected information to the travel management device 200 via the communicator 201 or the communication device 501.

The state detector 202 may acquire the information of the traveling state of the mobile object using the sensor 401. The information indicating the traveling state of each mobile object may include time at which the traveling state of each mobile object is detected. The sensor 401 is a sensor for detecting a state of the mobile object. The sensor 401 is a traveling path side sensor such as a proximity sensor, a pressure sensor and a photoelectric sensor as an example. The sensor 401 detects arrival, passing and a direction of the mobile object, whether or not package is loaded, and the like. The sensor 401 may be a camera provided on a ceiling of a facility. In a case where the sensor 401 is a camera, the state detector 202 specifies a position of each mobile object on the basis of a captured image. By using the sensor 401 or the communication device 501, it is possible to detect the traveling state of the mobile object even when the mobile object exists at a position where the mobile object cannot perform communication with the communicator 201.

Each mobile object 301 receives movement command data from the travel management device 200 and autonomously travels on the virtual traveling path in accordance with the movement command data. As means for autonomous traveling, there is means in which the mobile object autonomously travels among the reference areas using SLAM (Simultaneous Localization And Mapping), or the like. Means other than the means described here may be used.

FIG. 14 is a flowchart of overall operation of the travel planning system 1. It is assumed that the route plan of each mobile object is provided in advance, the travel timing schedule is generated by the travel timing scheduler 105, and a travel plan in which time information of the travel timing schedule is provided to the route plan is generated. It is assumed that each mobile object operates on the basis of the movement command data based on the travel timing schedule and passing order (travel order plan).

The travel management device 200 detects the position and the traveling direction of each mobile object (step 11). Note that, upon operation start of the travel planning system 1, it is only necessary to detect an initial position and a direction of each mobile object. Note that, in a case of a mobile object which can turn at the place and can move in all directions, there can be a case where the traveling direction is not detected. The position and the traveling direction of each mobile object may be notified by the mobile object itself, or latest information which is regularly reported from each mobile object and stored in the state storage 104 may be used as a current position.

The route planner 110 generates the route plan starting from the update position for each mobile object or selects/extracts part of the route plan prepared in advance. The previous route plan is updated with the generated or selected/extracted route plan (step 12). Note that, upon start of operation of the travel planning system 1, it is only necessary to generate the route plan starting from the initial position of each mobile object or acquire the route plan from outside.

In a case where the route plans are not generated for all the mobile objects (step 13: Yes), processing of the present flowchart is finished. For example, in a case where there is no package to be transported, no work to be done, or the like, the route plan is not generated for the mobile object. The present processing may be finished if update of the travel timing schedule does not finish in time (for example, there is a possibility that current operation of all the mobile objects will finish before the travel timing schedule is updated). Alternatively, the present processing may be finished also in a case where it is determined that the route plan cannot be generated.

In a case where the route plan is updated (regenerated) for at least one mobile object (step 13: No), the travel timing scheduler 105 generates the travel timing schedule of each mobile object on the basis of the updated route plan of the mobile object (step 14). The travel timing scheduler 105 generates the travel plans by providing time information indicated in the travel timing schedules to the route plans. Note that, for the mobile object (for example, the mobile object whose operation has been completed) for which the route plan is not generated, the travel timing schedule is not generated. Note that, upon start of operation of the travel planning system 1, because the route plans for all the mobile objects exist, traveling timing schedules for all mobile objects are generated.

Next, the passing order determiner 106 updates the passing order information using the method described in FIGS. 12A and 12B, or the like, (in a case of the first time, generates passing order information), and provides the passing order information to the travel controller 108 (step 15).

The commander 107 generates movement command data for each mobile object on the basis of the travel timing schedule of each mobile object and the passing order information generated in step 15 (step 16), and transmits the movement command data of each mobile object to the travel management device 200.

The travel management device 200 transmits the movement command data to each mobile object using the communicator 201 (step 16).

The state detector 202 of the travel management device 200 acquires information of the traveling state (for example, position information) of each mobile object in real time via at least one of the communicator 201, the sensor 401 and the communication device 501 (step 17). The state detector 202 transmits the information of the traveling state of each mobile object to the replan determiner 109 via the communicator 201 (also step 17).

The replan determiner 109 judges whether there exists at least one mobile object which cannot meet the travel plan (or the travel timing schedule) or judges whether or not replan is required due to external factors such as occurrence of new work on the basis of the travel plan of each mobile object and the traveling state of each mobile object (step 18). The replan determiner 109 generates a replan trigger in a case where it is determined to perform replan (step 18: Yes).

In a case where the replan trigger is generated (step 19: Yes), the processing returns to step 11. Then, the route plans and the traveling timing schedules of all the mobile objects (except the mobile object for which execution of the plan has already been finished) are updated (step 11 to step 17). Then, the movement command data based on the updated timing schedule is transmitted to each mobile object again. Note that each mobile object updates the movement command data received previously with the received movement command data.

In a case where a replan trigger is not generated (step 18: No), it is judged whether there exists a mobile object for which the travel plan (or the travel timing schedule) has been finished. In a case where the travel plan has been finished (step 19: Yes) for at least one mobile object, the processing returns to step 11. Then, the route plans and the traveling timing schedules of all the mobile objects are updated (step 11 to step 17), the movement command data based on the updated timing schedule is retransmitted to each mobile object. In a case where there exists no mobile object for which the travel plan has been finished, the processing returns to step 17. The processing from step 17 to step 19 is repeated until the replan trigger is generated or until the mobile object for which the travel plan has been finished appears.

Details of step 14 in FIG. 14 will be described using FIG. 15, FIGS. 16A to 16C and FIGS. 17A to 17D. Note that a method for creating the travel timing schedule is not limited to the present method. In the present step, even in a case where the mobile objects travel in reverse directions on the same traveling path in the respective route plans or there exist a plurality of mobile objects with different speeds, the traveling timing schedules which ensure that a collision or deadlock of the mobile objects does not occur are generated. In generation of the traveling timing schedules, preconditions are set such that the route plans of the respective mobile objects are not changed.

Figure 15:
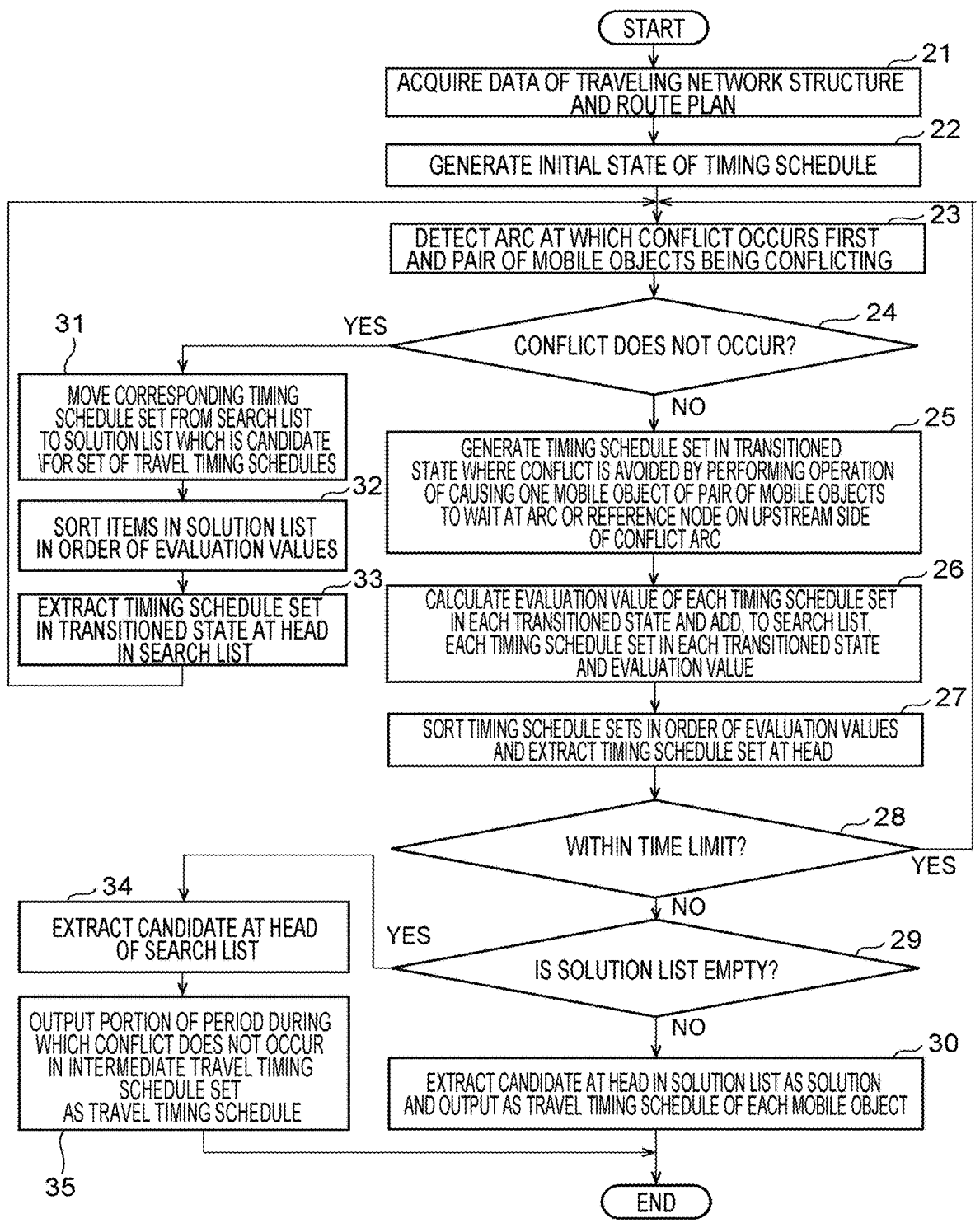
FIG. 15 is a flowchart of an example of processing by a travel timing scheduler.

FIG. 15 is a flowchart of an example of processing by the travel timing scheduler 105.

The travel timing scheduler 105 acquires the traveling network structure information (see FIG. 4 or FIG. 5) from the traveling network structure storage 101 and acquires data of the route plans from the route plan storage 102 (step 21).

The travel timing scheduler 105 generates a timing schedule (timing schedule in an initial state) in which at least one of time at which each mobile object arrives at each reference area and time at which each mobile object departs from each reference area is specified on the basis of the traveling network structure information and the route plan of each mobile object, as an example (step 22). These timing schedules in the initial states of the mobile objects will be collectively referred to as "a timing schedule set in an initial state". As a generation method of a timing schedule in an initial state, information regarding at least one of arrival time and departure time at and from each reference area in the route plan is set for each mobile object using an arbitrary method. For example, time of arrival or departure at or from each reference area is calculated on the basis of standard speed of the mobile object and a period length required for work, and information of the calculated time is set. In a case where there is a condition (for example, a speed pattern) regarding speed at which the mobile objects travel on each virtual traveling path, the timing schedule is generated so as to satisfy the condition regarding the speed. Alternatively, it is also possible to divert part (portion after the update position) of the travel timing schedule which has been generated previously without changing the part.

The travel timing scheduler 105 detects a pair of two mobile objects between which conflict (such as deadlock or a collision) will occur first in a time direction and an arc (virtual traveling path) on which the conflict will occur, on the basis of the timing schedule set in the initial state (detection processing) (step 23). That is, a pair of two mobile objects and an arc (virtual traveling path) which satisfy conflict conditions are detected. As an example, time at which conflict will occur first is specified for each of all combinations of two timing schedules in the timing schedule set in the initial state. Time which is temporally earliest among the specified time is selected. A pair of two mobile objects between which conflict will occur at the selected time is detected, and an arc (virtual traveling path) on which the conflict will occur are also detected.

Figure 16C:
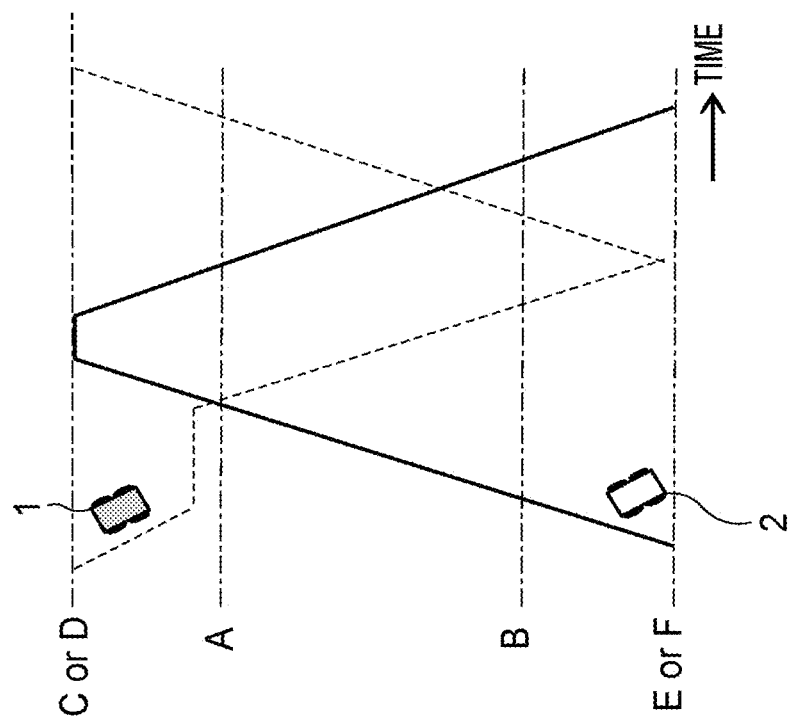
FIGS. 16A to 16C each are a diagram illustrating an example of conflict check and avoidance processing.
Figure 16B:
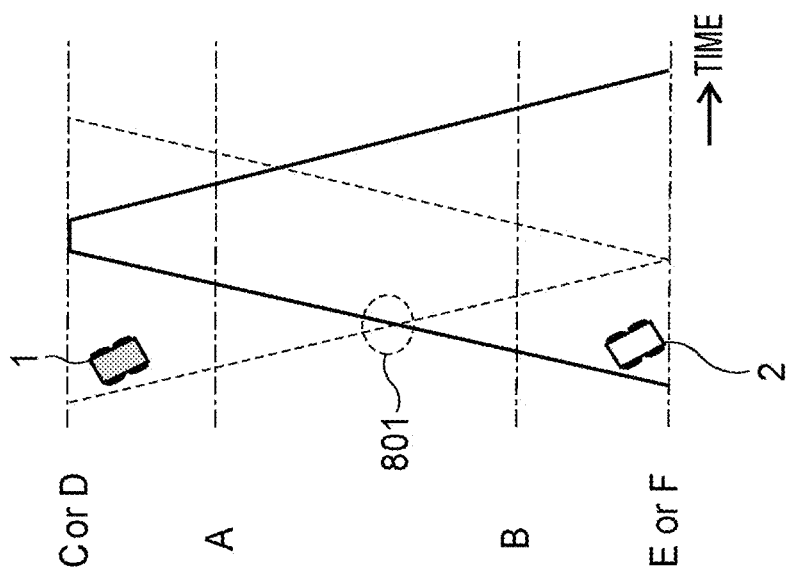
Figure 16A:
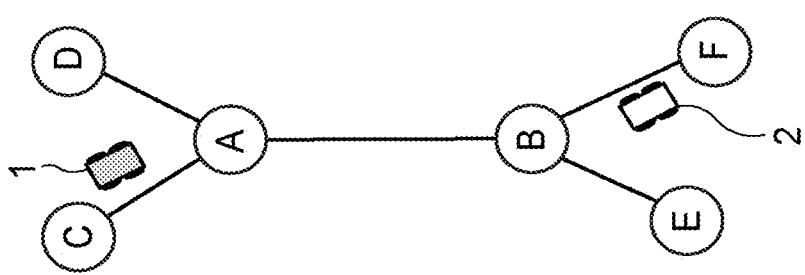

FIG. 16A is a diagram for explaining an example where conflict will occur in a case where two mobile objects (indicated as a mobile object 1 and a mobile object 2) travel in a travel network with a simple structure. It is assumed here that the route plane of the mobile object 1 and the route plan of the mobile object 2 defines that the mobile object 1 travels back and forth between the reference node C and the reference node E, and the mobile object 2 travels back and forth between the reference node F and the reference node D.

Here, on the traveling path (section AB) between the reference node A and the reference node B, the mobile object 1 and the mobile object 2 travel in directions reverse to each other. If the mobile object 1 and the mobile object 2 keep traveling as it is, in a case where the mobile object 1 and the mobile object 2 cannot travel backward on the traveling path, deadlock occurs. Even if at least one of the mobile object 1 and the mobile object 2 can travel backward, efficiency drastically degrades due to stop and backward traveling for avoiding a collision.

FIG. 16B is a graph indicating movement trajectories of the mobile object 1 and the mobile object 2 over time on the basis of the timing schedules in the initial states of the mobile object 1 and the mobile object 2. A graph with a dashed line is a graph for the mobile object 1, and a graph with a solid line is a graph for the mobile object 2. Whether or not there occurs conflict (whether or not conflict conditions are satisfied) can be detected by checking intersections of the movement trajectories for each virtual traveling path (section). In this example, the movement trajectories of the mobile object 1 and the mobile object 2 intersect (conflict conditions are satisfied) at a point 801 in the section AB. Therefore, it is possible to detect occurrence of conflict between the mobile object 1 and the mobile object 2 in the section AB.

Figures 17A, 17B, 17C, 17D:
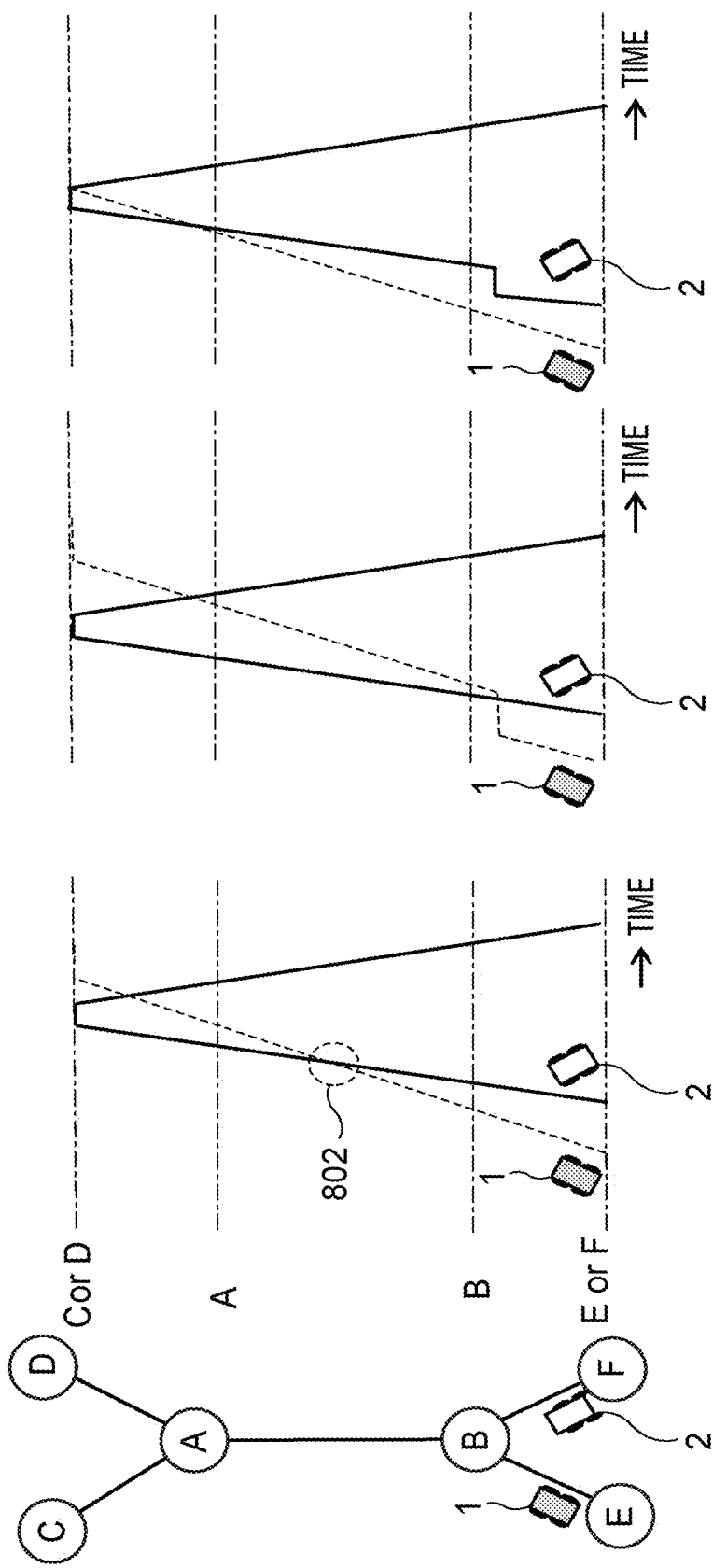
FIGS. 17A to 17D each are a diagram illustrating another example of conflict check and avoidance processing.

FIG. 17A is a diagram for explaining another example where conflict (collision) occurs in a case where two mobile objects (indicated as a mobile object 1 and a mobile object 2) travel. It is assumed here that the route plan of the mobile object 1 and the route plan of the mobile object 2 defines that the mobile object 1 travels back and forth between the reference node E and the reference node C, and the mobile object 2 travels back and forth between the reference node F and the reference node D.

The mobile object 1 and the mobile object 2 travel in the same direction in the section AB. Because the section AB has a traveling network structure in which passing is impossible, in a case where movement speed of the mobile object 1 is different from movement speed of the mobile object 2, a rear-end collision or temporary stop can occur in the section AB. As a result of temporary stop and re-traveling for preventing a rear-end collision being repeated, traveling efficiency may degrade.

FIG. 17B is a graph illustrating the movement trajectories of the mobile object 1 and the mobile object 2 over time on the basis of the timing schedules (initial states) of the mobile object 1 and the mobile object 2. A graph with a dashed line is a graph for the mobile object 1, and a graph with a solid line is a graph for the mobile object 2. While the mobile object 2 departs behind the mobile object 1, because the speed of the mobile object 2 is faster than the speed of the mobile object 1, the mobile object 2 collides with the mobile object 1 from behind. The movement trajectory of the mobile object 1 intersects with the movement trajectory of the mobile object 2 (conflict conditions are satisfied) at a point 802, and the mobile object 1 collides with the mobile object 2 at a position corresponding to the point 802. In this manner, it is possible to detect occurrence of conflict between the mobile object 1 and the mobile object 2 in the section AB.

While, in the description of FIGS. 16A to 16C and FIGS. 17A to 17D, a traveling path having a structure where two mobile objects cannot travel in directions reverse to each other (cannot avoid each other), or a virtual traveling path having a structure where passing is impossible has been dealt with, there can be a non-interference traveling path in which mobile objects can avoid each other or passing is possible, and for which interference can be ignored. For example, a traveling path BE, a traveling path BA, a traveling path BH, and the like, in FIG. 2 are traveling paths in which mobile objects can avoid each other because there is room around the traveling paths. Arcs (virtual traveling paths) corresponding to such traveling paths may be regarded as arcs where conflict does not occur even if the conflict conditions are satisfied in step 23. Whether or not the traveling path is a non-interference traveling path is stored in the traveling network structure storage 101 in association with an arc ID (virtual traveling path ID).

In a case where a pair of mobile objects between which conflict may occur can be detected in step 23 (step 24: No), a plurality of measures or at least one measure for avoiding conflict is determined for an arc (conflict arc) in which conflict will occur. For example, it is possible to avoid the conflict by performing operation of causing one mobile object of one of the mobile objects in the pair to wait on a traveling path corresponding to an arc (virtual traveling path) or in a reference area on an upstream side of the conflict arc. In this case, it can be said that there are two measures. Therefore, the timing schedule set is updated (update processing) so as to change at least one of the timing schedules of at least two mobile objects between which conflict will occur for each of the two measures (step 25).

It is assumed, for example, that a plurality of mobile objects 1 to H (H is an integer of equal to or greater than 2) exist. In a case where the mobile object 1 conflicts with the mobile object 2, there are two measures: a measure in which the mobile object 1 is caused to wait, and a measure in which the mobile object 2 is caused to wait. In this case, for the set of timing schedules of the mobile objects 1 to H, the set is updated by changing at least one of the timing schedules of at least the mobile object 1 and the mobile object 2 for each of the two measures. Thereby, two updated sets can be obtained from one set.

The updated timing schedule set(s) each will be referred to as "a timing schedule set in a transitioned state". The timing schedule set before update is stored.

FIG. 16C illustrates an operation example of conflict avoidance in step 25. FIG. 16C illustrates an example where, to avoid conflict at the point 801 detected in FIG. 16B, the mobile object 1 avoids conflict by waiting or adjusting speed (reducing speed) on a traveling path corresponding to an arc CA which is located upstream of an arc (virtual traveling path) AB. As another method for avoiding the conflict detected in FIG. 16B, it is also possible to employ a method in which the mobile object 2 waits or adjusts speed (reduces speed) on a traveling path corresponding to a virtual traveling path FB which is located upstream of the virtual traveling path BA. By operation of avoiding conflict being performed in this manner, the movement trajectory of the mobile object 1 does not intersect with the movement trajectory of the mobile object 2 on the virtual traveling path AB. Therefore, conflict is avoided.

FIG. 17C and FIG. 17D illustrate another operation examples of conflict avoidance in step 25. FIG. 17C illustrates an example where, to avoid conflict at the point 802 detected in FIG. 17B, the mobile object 1 avoids conflict by waiting on a traveling path corresponding to a virtual traveling path EB which is located upstream of the virtual traveling path BA. In a similar manner, FIG. 17D illustrates an example where the mobile object 2 avoids conflict by waiting on a traveling path corresponding to a virtual traveling path FB which is located upstream of BA.

The travel timing scheduler 105 calculates an evaluation value for each generated timing schedule set in the transitioned state (calculation processing). The travel timing scheduler 105 adds each generated timing schedule set and each evaluation value which are associated with each other, to a search list (step 26). The search list is a list in which a plurality of timing schedule sets which are being processed are temporarily stored.

Here, a calculation example of the evaluation value of the timing schedule is described. Traveling period lengths of paths traveled by each mobile object in a case where each mobile object travels on respective paths without time for conflict being adjusted (for example, traveling period lengths in a case where each mobile object travels on the paths in accordance with a timing schedule in an initial state) are calculated as reference values. For the reference values, a sum or a power sum of delay times due to adjustment of time is calculated, the calculated values for the mobile objects are added up. The added-up value is set as a penalty evaluation value. In this example, as the evaluation value is smaller, evaluation becomes higher. However, the evaluation value may be defined so that evaluation becomes higher as the evaluation value is smaller. The calculation method of the evaluation value will be described in detail later. The calculation method of the evaluation value is not limited to a particular method.

The travel timing scheduler 105 sorts the respective timing schedule sets in the transitioned states in the search list in descending order of the evaluation values (step 27). The travel timing scheduler 105 extracts a timing schedule set in a transitioned state at the head of the search list as a target to be searched next (also step 27). That is, one timing schedule set in a transitioned state is selected from the timing schedule sets in the transitioned states in the search list (selection processing).

The travel timing scheduler 105 judges whether the calculation period falls within a predetermined time limit or whether or not the number of times of repetition falls within a predetermined number of times (step 28). An arbitrary portion in the flowchart can be set as a target for judging the number of times of repetition. For example, the targeted portion may be processing from step 23 to 28. If the calculation period falls within the time limit or the number of times of repetition falls within the predetermined number of times (step 28: Yes), the processing returns to step 23. In step 23 returned, detection processing is continuously performed where the timing schedule in the transitioned state extracted in step 27 is newly regarded as a timing schedule in an initial state. The detection process includes detecting an arc at which conflict first occurs and a pair of mobile objects which conflict (conflict detected last time or before the last time has been solved).

In a case where conflict does not occur in the timing schedule set as a processing target in step 23 (step 24: Yes), the timing schedule set becomes a candidate for a travel timing schedule set to be output. Therefore, the corresponding timing schedule set in the transitioned state is moved to a solution list from the search list as the candidate for the travel timing schedule set along with the evaluation value (step 31). The solution list is a list in which candidates for the travel timing schedule set to be output are temporarily stored.

The travel timing scheduler 105 sorts items in the solution list in order of the evaluation values (step 32).

The travel timing scheduler 105 extracts the timing schedule set at the head of the search list as the next processing target (step 33), and the processing returns to step 23 while the extracted timing schedule set is regarded as the timing schedule set in the initial state.

In a case where the calculation period exceeds the time limit or the number of times of repetition exceeds the predetermined number of times (step 28: No), the travel timing scheduler 105 checks whether the solution list includes at least one candidate for the travel timing schedule set (step 29). In a case where the solution list is not empty (step 29: No), a candidate for the travel timing schedule set at the head of the solution list is output as a solution. That is, the timing schedule of each mobile object included in the candidate is output as the travel timing schedule of each mobile object (step 30). Because items in the solution list are sorted in descending order of the evaluation values, the candidate at the head of the solution list is a timing schedule set with the highest evaluation.

Meanwhile, in a case where the solution list is empty (step 29: Yes), the travel timing scheduler 105 extracts the timing schedule set in the transitioned state at the head of the search list as a solution (step 34). A range of a period (a plan portion which is partially completed) in which conflict is solved in the timing schedule of each mobile object in the extracted solution is specified, and the plan portion of the specified range is output as the travel timing schedule of each mobile object (step 35).

Figure 18:
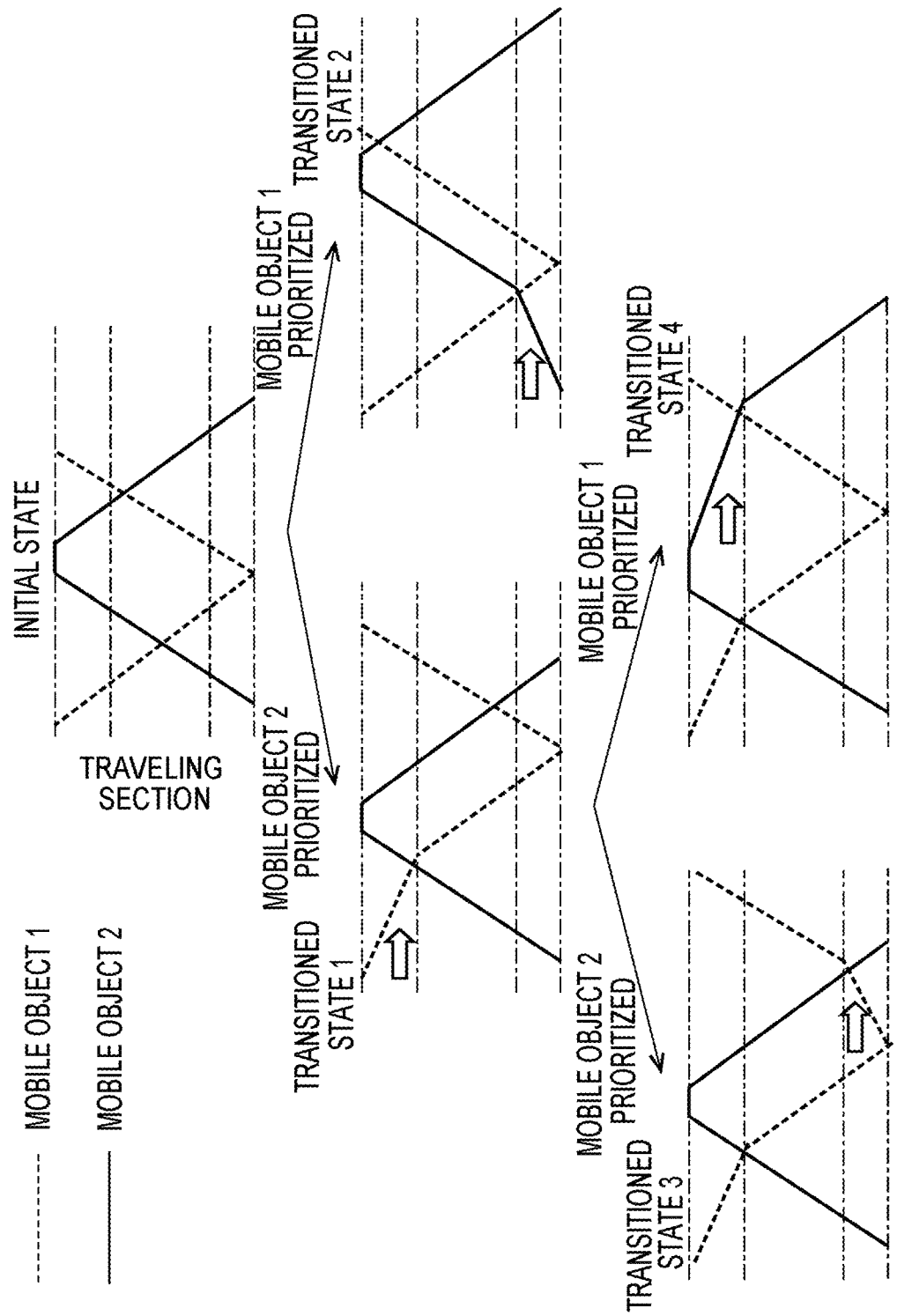
FIG. 18 is a diagram illustrating a conceptual example of search processing by the travel timing scheduler.

FIG. 18 illustrates a conceptual diagram of search processing of the travel timing scheduler in the flowchart in FIG. 15. A top portion in FIG. 18 corresponds to the travel timing schedule illustrated in FIG. 16B (however, scale is changed).

There are two patterns of conflict avoidance measures for the virtual traveling path (conflict arc) on which traveling in reverse directions will occur: a measure in which the mobile object 1 is caused to wait and a measure in which the mobile object 2 is caused to wait. Time at which conflict will occur next and the virtual traveling path on which conflict will occur next change depending on which of the mobile objects is caused to wait to avoid conflict. In step 25 in FIG. 15, a timing schedule set in a transitioned state 1 can be obtained if operation of prioritizing the mobile object 2 (operation of causing the mobile object 1 to wait) is performed, and a timing schedule set in a transitioned state 2 can be obtained if operation of prioritizing the mobile object 1 (operation of causing the mobile object 2 to wait) is performed. Note that an outline arrow in the drawing indicates a changed portion in the graph.

The evaluation values are respectively calculated for the timing schedule set in the transitioned state 1 and the timing schedule set in the transitioned state 2, and the timing schedule set in the transitioned state 1 and the timing schedule set in the transitioned state 2 are stored in the search list along with the respective evaluation values (step 26 in FIG. 15). Items in the search list are sorted in descending order of the evaluation values, and, because the evaluation value of the timing schedule set in the transitioned state 1 is greater, the timing schedule set in the transitioned state 1 is selected (step 27 in FIG. 15).

Search recursively proceeds while the timing schedule set in the transitioned state 1 is regarded as the timing schedule set in the initial state (step 23 in FIG. 15), and the timing schedule set in the transitioned state 3 and the timing schedule set in the transitioned state 4 are obtained depending on which of the mobile object 2 and the mobile object 1 is prioritized. The evaluation values are respectively calculated for the timing schedule set in the transitioned state 3 and the timing schedule set in the transitioned state 4. The timing schedule set in the transitioned state 3 and the timing schedule set in the transitioned state 4 are stored in the search list along with the respective evaluation values (step 26 in FIG. 15).

In the search list, the timing schedule set in the transitioned state 2 at this time point, the timing schedule set in the transitioned state 3, and he timing schedule set in the transitioned state 4 are stored along with the respective evaluation values. Among these, the timing schedule set having the greatest evaluation value is selected, and processing recursively proceeds while this is regarded as the timing schedule set in the initial state (step 23).

In this manner, in the search algorithm in FIG. 15, combinations of conflict avoidance measures are sequentially searched. If the number of mobile objects is large or the number of conflict arcs is large, the number of combinations of the conflict avoidance measures becomes enormous, which typically makes it difficult to generate plans in real time; however, in the search algorithm in FIG. 15, evaluation values of the timing schedule sets in the transitioned states which are to be examined next are calculated, and search is preferentially performed from the timing schedule set with a higher evaluation value. Therefore, it is possible to perform efficient search.

At this time, by applying a search method called heuristic optimal solution search algorithm ("A search"), it is possible to obtain a timing schedule with high evaluation in a short period of time. In the A search, for example, the evaluation value is calculated on the basis of a sum of delay times for traveling paths (searched circuits) for which conflict has been solved in the target timing schedule set, and predicted values of delay times expected for remaining traveling paths (unsearched paths) after the searched paths.

Specifically, a sum of the remaining traveling distances in the route plans of the respective mobile objects is calculated for time after time at which conflict is avoided last in the timing schedule set. Predicted values of delay times in the remaining traveling are obtained through assumption that delays may occur at a fixed ratio depending on the remaining traveling distances. For example, traveling period lengths in a case where the mobile objects travel on the remaining traveling distances at standard speed are calculated, and values obtained by multiplying the traveling period lengths by a fixed coefficient are calculated as the delay times. A sum of the calculated delay times and a sum of delay times of the mobile objects before time at which the above-described conflict occurs are added up, and an inverse of the added-up value is set as the evaluation value.

As described above, according to the present embodiment, it is possible to efficiently make travel plans of a plurality of mobile objects while avoiding conflict such as deadlock and/or a collision. Further, even in a case where movement in both directions on the same traveling path must occur, it is possible to generate traveling timing schedules which ensure that a collision or deadlock does not occur. As an example of the case where movement in both directions on the same traveling path must occur, there is a case where the mobile objects travel on traveling paths of a tree structure shape, a case for a reason of safety, or the like. Conflict of a non-autonomous traveling mobile object which travels on a traveling path such as a rail and a guide tape laid in advance is avoided by a dedicated traveling path or traveling space being provided in advance, or by preventing occurrence of movement in reverse directions on the same traveling path. In a case of a non-autonomous traveling mobile object, because it is possible to strictly manage traveling with movement time, or the like, such a method is effective. However, in a case of an autonomous traveling mobile object in the present embodiment, it is difficult to strictly manage traveling with movement time, or the like, because unexpected movement in both directions at an arbitrary position occurs in traveling on a free plane. In the present embodiment, it is possible to cause a plurality of mobile objects to travel while avoiding conflict by controlling passing order of the node to be managed even in a case of such an autonomous traveling mobile object.

(Hardware Configuration)

Figure 19:
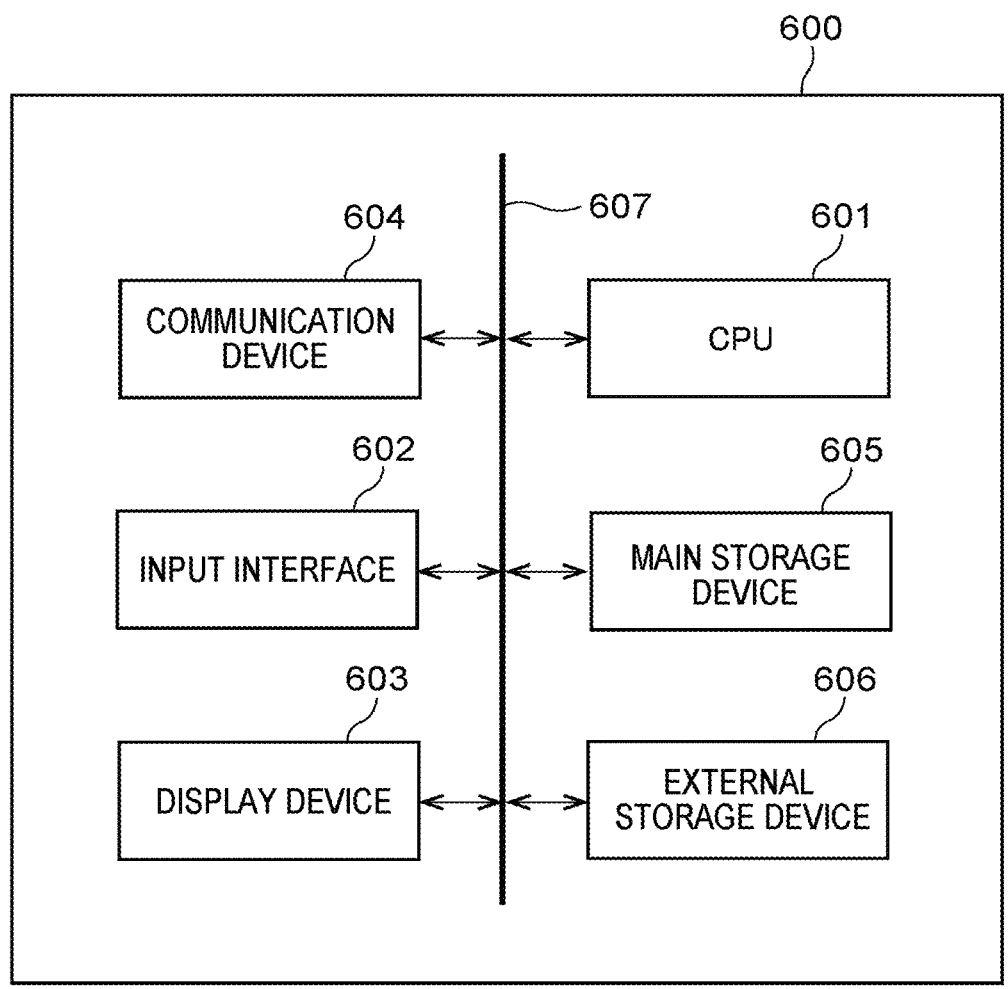
FIG. 19 is a diagram illustrating a hardware configuration of a travel planning device in FIG. 1.

FIG. 19 illustrates a hardware configuration of the travel planning device 100 according to any one of the first to third embodiments. The travel planning device 100 according to the present embodiment is configured with a computer device 600. The computer device 600 includes a CPU 601, an input interface 602, a display device 603, a communication device 604, a main storage device 605 and an external storage device 606, and these are connected to each other with a bus 607. The travel management device 200 in FIG. 1 can be also configured by the hardware configuration similar to that of FIG. 19.

The CPU (Central Processing Unit) 601 executes a computer program (travel control program) which realizes the above-described respective functional configurations of the travel planning device 100 on the main storage device 605. The computer program may be configured by not only a single program but also a plurality of programs, scripts or combinations thereof. By the CPU 601 executing the computer program, the respective functional configurations are realized.

The input interface 602 is a circuit for inputting an operation signal from the input device such as a keyboard, a mouse and a touch panel, to the travel planning device 100.

The display device 603 displays data or information output from the travel planning device 100. While the display device 603 is, for example, an LCD (Liquid Crystal Display), a CRT (Cathode-Ray Tube), and a PDP (Plasma Display Panel), the display device 603 is not limited to this. The data or the information output from the computer device 600 can be displayed by this display device 603.

The communication device 604 is a circuit for the travel planning device 101 to communicate with an external device in a wireless or wired manner. Information can be input from the external device via the communication device 604. Information input from the external device can be stored in a DB. A constitution for performing communication in the travel planning device can be constructed on the communication device 604.

The main storage device 605 stores a program which realizes processing of the present embodiment, data required for execution of the program, data generated by execution of the program, and the like. The program is developed and executed on the main storage device 605. While the main storage device 605 is, for example, a RAM, a DRAM and an SRAM, the main storage device 605 is not limited to this. The storage or the database in FIG. 1 may be constructed on the main storage device 605.

The external storage device 606 stores the above-described program, data required for execution of the program, data generated by execution of the program, and the like. These kinds of program and data are read out to the main storage device 605 upon processing of the present embodiment. While the external storage device 606 is, for example, a hard disk, an optical disk, a flash memory and a magnetic tape, the external storage device 606 is not limited to this. The storage or the database in FIG. 1 may be constructed on the external storage device 606.

Note that the above-described program may be installed in the computer device 600 in advance or may be stored in a storage medium such as a CD-ROM. Further, the program may be uploaded on the Internet.

Further, the travel planning device 100 may be configured with a single computer device 600 or may be configured as a system including a plurality of computer devices 100 which are connected to each other.

Second Embodiment

Figure 20:
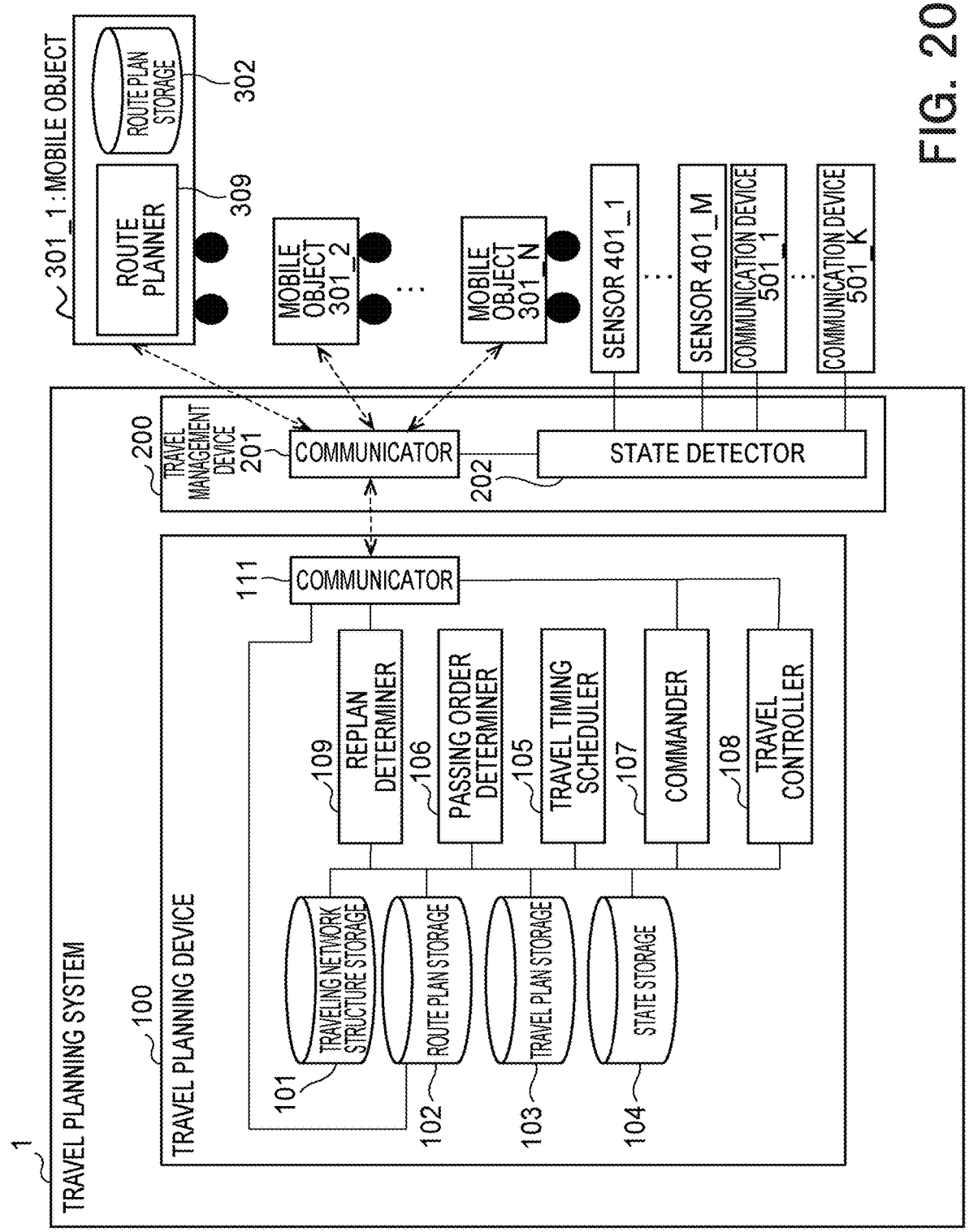
FIG. 20 is a diagram illustrating an example of an entire system configuration including a travel planning system according to a second embodiment.

FIG. 20 illustrates an example of an entire system configuration including a travel planning system according to a second embodiment. Each mobile object includes a route planner 309 and a route plan storage 302, and the travel planning device 100 does not include a route planner. The route planner 309 has functions similar to those of the route planner 110 in FIG. 1.

The route planner 309 of each mobile object autonomously determines a route plan and stores the route plan in the route plan storage 302. Further, each mobile object transmits data of the route plan to the travel planning device 100 via the communicator 201 of the travel management device 200 or the communication device 501. The travel planning device 100 stores the route plan of each mobile object in the route plan storage 102. The route planner 309 does not have to be provided at each mobile object, and a route (traveling paths) of each mobile object may be stored in the route plan storage 302 of each mobile object in advance.

In the present embodiment, because the route plan of each mobile object is determined in advance or each mobile object autonomously determines a route plan, a case is assumed where the route plan of each mobile object cannot be freely changed on the travel planning device 100 side and the travel management device 200 side. Even in such a case, by appropriately generating the travel timing schedule at the travel planning device 100 and instructing each mobile object on the movement command data, it is possible to ensure traveling in which a collision, deadlock, or the like, does not occur. If the travel timing schedule which prevents occurrence of a collision or deadlock cannot be generated, the travel planning device 100 may transmit a request for changing the route plan to each mobile object via the travel management device 200.

Third Embodiment

Figure 21:
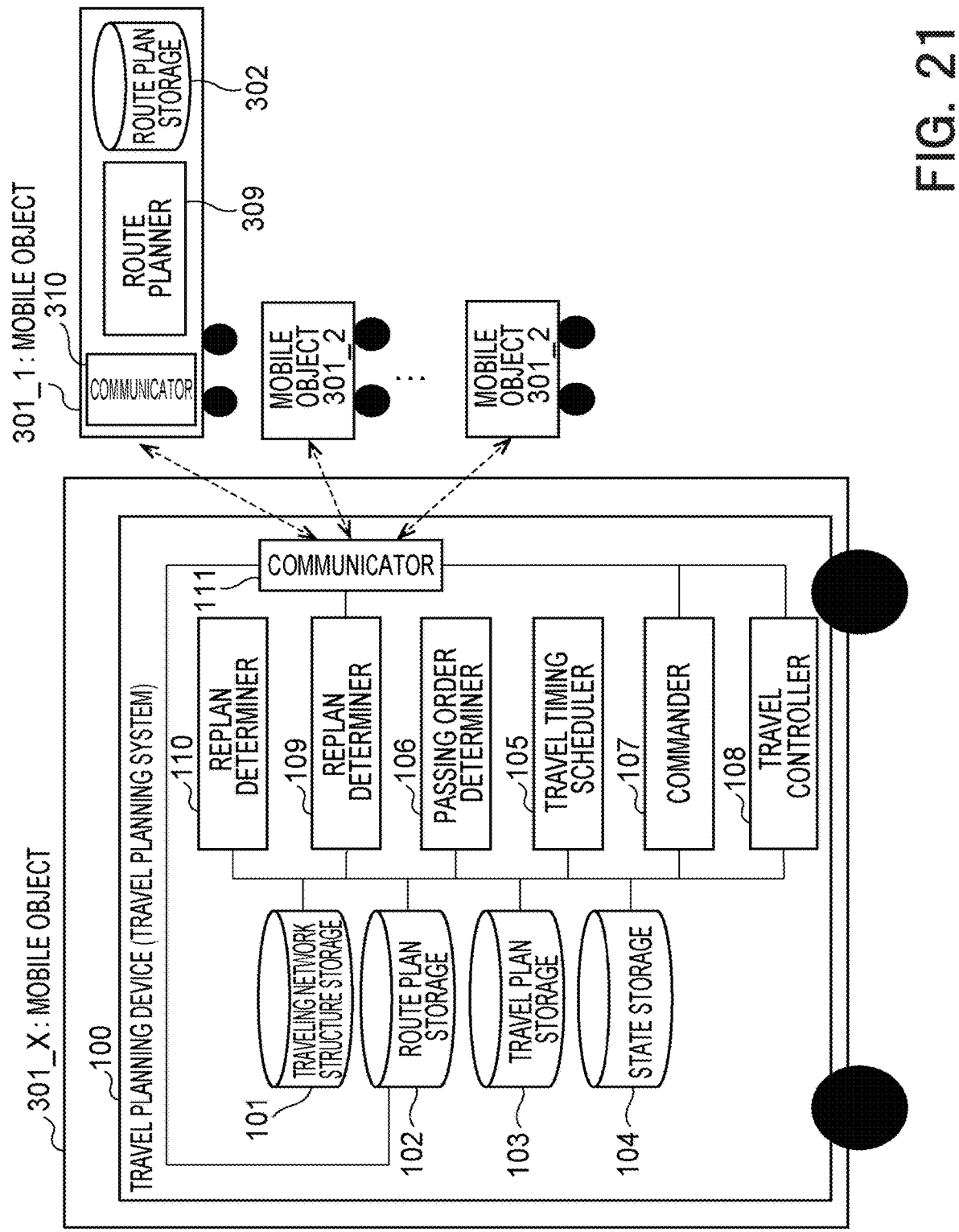
FIG. 21 is a diagram illustrating an example of an entire system configuration including a travel planning system according to a third embodiment.

FIG. 21 illustrates an example of an entire system configuration including a travel planning system according to a third embodiment. In the present embodiment, while basic functional parts are the same as those in the first or the second embodiment, at least one mobile object includes functions corresponding to the travel planning device (or the travel planning system). Other mobile objects include a route planner 309, a route plan storage 302 and a communicator 310. The communicator 310 performs wireless communication with other mobile objects.

One mobile object among mobile objects having functions corresponding to the travel planning device becomes a master. In the drawing, an example is illustrated where a mobile object 301_X becomes a master. The master may be determined through, for example, negotiation among mobile objects having functions corresponding to the travel planning device. Alternatively, the master may be determined in accordance with priority determined in advance. For example, a mobile object with the highest performance or a mobile object with a largest remaining battery amount may become the master. The master may be determined using other methods.

The route planners 309 of mobile objects other than the mobile object 301_X autonomously determine route plans, and then transmit the route plans to the mobile object 301_X which becomes the master. Alternatively, the route plans may be stored in advance in the route plan storage 302. In this case, the route planner 309 reads out data of the route plan within the route plan storage 302 without generating the route plan by itself and transmits the data to the master.

The mobile object 301_X which becomes the master collectively generates traveling timing schedules of a plurality of mobile objects including the own mobile object. The master generates a timing schedule of each mobile object so that the route plan of each mobile object is not changed. The mobile object 301_X transmits the movement command data based on the travel timing schedule of each mobile object to each mobile object. Each mobile object controls traveling on the basis of the movement command data. By this means, it is possible to realize efficient traveling as a whole in which a collision, deadlock, or the like, does not occur.

Mobile objects other than the mobile object 301_X do not have to include the route planner 309 and the route plan storage 302. In this case, the mobile objects other than the mobile object 301_X perform operation similar to that of the mobile object which can perform communication with the communicator 201 of the travel management device 200 among the mobile objects in the first embodiment.

In the third embodiment, because the route plan of each mobile object is determined in advance or each mobile object autonomously determines the route plan, a case is assumed where other persons cannot freely change the route plan. Also in such a case, by the mobile object which becomes the master appropriately generating the travel timing schedule and instructing each mobile object on the travel timing schedule, it is possible to ensure traveling in which a collision or deadlock does not occur. If the travel timing schedule which prevents occurrence of a collision or deadlock cannot be generated, the mobile object which becomes the master may transmit a request for changing the route plan to other mobile objects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A travel control device comprising:
communication circuitry configured to communicate with a plurality of mobile objects in a travelling area including a plurality of areas and a plurality of traveling paths connecting among the areas; and
processing circuitry configured to
create travel timing schedules including information for specifying areas to pass through by each of the mobile objects and timings to pass through the areas by each of the mobile objects based on route plans of the mobile objects and a conflict condition at which conflict occur among the mobile objects,
determine passing order of the mobile objects to pass through a first area on a basis of the travel timing schedules, the first area being commonly included in the route plans of the mobile objects, and
control traveling of the plurality of mobile objects by transmitting movement command data via the communication circuitry to the mobile objects based on the passing order and the travel timing schedules, the movement command data including a command for controlling traveling of the at least one of the mobile objects,
wherein the conflict condition comprises one of:
(1) two or more of the mobile objects traveling in reverse directions on a traveling path exist at a same time;
(2) two or more of the mobile objects moving in a same direction on a traveling path collide, and
(3) two or more of the mobile objects arrive at an intersection portion leading to a traveling path at a same time, or in a state where one or more of the mobile objects waits at an intersection portion leading to the traveling path, another one of the mobile objects passes through the traveling path,
wherein the processing circuitry is further configured to determine, as the passing order, an order in which the conflict condition is not satisfied,
the route plans of the mobile objects include an order of areas through which each of the mobile objects passes among the plurality of areas in the traveling area, and
the processing circuitry is configured to create the travel timing schedules by determining timing at which the mobile objects pass through the areas included in respective route plans under a constraint that the order of the areas through which the mobile objects pass as indicated in respective route plans is not changed.

2. The travel control device according to claim 1, wherein the first area is an area included in routes of the plurality of mobile objects.

3. The travel control device according to claim 1, wherein the processing circuitry detects the first area on a basis of routes of the plurality of mobile objects.

4. The travel control device according to claim 1, wherein:
the processing circuitry is configured to determine passing times of the first area on a basis of routes of the plurality of mobile objects,
wherein the processing circuitry determines the passing order on a basis of the passing times.

5. The travel control device according to claim 1, wherein the processing circuitry judges whether a traveling path leading to the first area has a structure that allows the mobile objects to avoid conflicts with each other and determines the passing order regardless of whether the conflict condition is satisfied in a case where the traveling path has the structure in which the conflict is avoidable.

6. The travel control device according to claim 1, wherein:
the processing circuitry generates movement command data of the mobile objects on a basis of the passing order.

7. The travel control device according to claim 1, wherein the movement command data comprises:
a command to instruct the mobile object to pass through the first area in a case where passing of the first area is allowed for the mobile object.

8. The travel control device according to claim 7, wherein the processing circuitry determines whether to allow passing of the first area on a basis of the passing order for the mobile object.

9. The travel control device according to claim 1, wherein the processing circuitry transmits a notification of allowance or non-allowance of the passing of the first area by the mobile object.

10. The travel control device according to claim 8, wherein, the processing circuitry adjusts arrival time of the mobile object at the first area by causing the mobile object to wait at a position different from the first area or reducing movement speed of the mobile object in a case where the processing circuitry does not allow passing of the first area by the mobile object.

11. The travel control device according to claim 7, wherein the processing circuitry determines that the mobile object has passed through the first area in a case where a passing completion notification including information indicating that the mobile object has passed through the first area is received from the mobile object which has passed through the first area.

12. The travel control device according to claim 1, wherein
the movement command data includes a command to make confirmation as to whether passing of the first area is allowed before the mobile object passes through the first area.

13. The travel control device according to claim 12, wherein the processing circuitry determines whether at least one of a first mobile object and a second mobile object is required to execute a command to make confirmation as to allowance of passing of the first area located at one end of the traveling path, on a basis of information as to whether the first mobile object and the second mobile object traveling in reverse directions on a traveling path exist.

14. The travel control device according to claim 12, wherein first to third traveling paths leading to the first area exist, and
the processing circuitry determines whether at least one of a first mobile object and a second mobile object is required to execute a command to make confirmation as to allowance of passing of the first area, on a basis of information as to whether the first mobile object and the second mobile object entering the third traveling path from the first and the second traveling paths by way of the first area exist.

15. The travel control device according to claim 13, wherein the processing circuitry determines whether at least one of a first mobile object and a second mobile object is required to execute a command to make confirmation as to allowance of passing of a first of the first area, based on a condition that it is not required to check whether the first mobile object has passed through the first of the first area before the second mobile object passes through the first of the first area if following conditions (1) to (4) are satisfied
(1) passing time of the first of the first area by the first mobile object is earlier than passing time of a second of the first area by the first mobile object,
(2) passing time of the first of the first area by the second mobile object is later than passing time of the second of the first area by the second mobile object,
(3) passing time of the first of the first area by the first mobile object is earlier than passing time of the first of the first area by the second mobile object, and
(4) passing time of the second of the first area by the first mobile object is earlier than passing time of the second of the first area by the second mobile object.

16. A travel control method comprising:
communicating with a plurality of mobile objects in a travelling area including a plurality of areas and a plurality of traveling paths connecting among the areas;
creating travel timing schedules including information for specifying areas to pass through by each of the mobile objects and timings to pass through the areas by each of the mobile objects based on route plans of the mobile objects and a conflict condition at which conflict occur among the mobile objects;
determining passing order of the mobile objects to pass through a first area on a basis of the travel timing schedules, the first area being commonly included in the route plans of the mobile objects; and
controlling traveling of the plurality of mobile objects by transmitting movement command data via the communication circuitry to the mobile objects based on the passing order and the travel timing schedules, the movement command data including a command for controlling traveling of the at least one of the mobile objects,
wherein the conflict condition comprises one of:
(1) two or more of the mobile objects traveling in reverse directions on a traveling path exist at a same time;
(2) two or more of the mobile objects moving in a same direction on a traveling path collide, and
(3) two or more of the mobile objects arrive at an intersection portion leading to a traveling path at a same time, or in a state where one or more of the mobile objects waits at an intersection portion leading to the traveling path, another one of the mobile objects passes through the traveling path,
wherein the method further comprises determining, as the passing order, an order in which the conflict condition is not satisfied,
the route plans of the mobile objects include an order of areas through which each of the mobile objects passes among the plurality of areas in the traveling area, and
the method further comprises creating the travel timing schedules by determining timing at which the mobile objects pass through the areas included in respective route plans under a constraint that the order of the areas through which the mobile objects pass as indicated in respective route plans is not changed.

17. A non-transitory computer readable medium having a computer program stored therein which causes a computer executing the computer program to perform processes comprising:
communicating with a plurality of mobile objects in a travelling area including a plurality of areas and a plurality of traveling paths connecting among the areas;
creating travel timing schedules including information for specifying areas to pass through by each of the mobile objects and timings to pass through the areas by each of the mobile objects based on route plans of the mobile objects and a conflict condition at which conflict occur among the mobile objects;
determining passing order of the mobile objects to pass through a first area on a basis of the travel timing schedules, the first area being commonly included in the route plans of the mobile objects; and
controlling traveling of the plurality of mobile objects by transmitting movement command data via the communication circuitry to the mobile objects based on the passing order and the travel timing schedules, the movement command data including a command for controlling traveling of the at least one of the mobile objects,
wherein the conflict condition comprises one of:
(1) two or more of the mobile objects traveling in reverse directions on a traveling path exist at a same time;
(2) two or more of the mobile objects moving in a same direction on a traveling path collide, and
(3) two or more of the mobile objects arrive at an intersection portion leading to a traveling path at a same time, or in a state where one or more of the mobile objects waits at an intersection portion leading to the traveling path, another one of the mobile objects passes through the traveling path,
wherein the processes further comprise determining, as the passing order, an order in which the conflict condition is not satisfied,
the route plans of the mobile objects include an order of areas through which each of the mobile objects passes among the plurality of areas in the traveling area, and
the processes further comprise creating the travel timing schedules by determining timing at which the mobile objects pass through the areas included in respective route plans under a constraint that the order of the areas through which the mobile objects pass as indicated in respective route plans is not changed.

18. A travel control system, comprising:
a plurality of mobile objects;
communication circuitry configured to communicate with the mobile objects in a travelling area including a plurality of areas and a plurality of traveling paths connecting among the areas; and
processing circuitry configured to
create travel timing schedules including information for specifying areas to pass through by each of the mobile objects and timings to pass through the areas by each of the mobile objects based on route plans of the mobile objects and a conflict condition at which conflict occur among the mobile objects,
determine passing order of the mobile objects to pass through a first area on a basis of the travel timing schedules, the first area being commonly included in the route plans of the mobile objects, and
control traveling of the plurality of mobile objects by transmitting movement command data via the communication circuitry to the mobile objects based on the passing order and the travel timing schedules, the movement command data including a command for controlling traveling of the at least one of the mobile objects, wherein the conflict condition comprises one of:
(1) two or more of the mobile objects traveling in reverse directions on a traveling path exist at a same time;
(2) two or more of the mobile objects moving in a same direction on a traveling path collide, and
(3) two or more of the mobile objects arrive at an intersection portion leading to a traveling path at a same time, or in a state where one or more of the mobile objects waits at an intersection portion leading to the traveling path, another one of the mobile objects passes through the traveling path, wherein the processing circuitry is further configured to determine, as the passing order, an order in which the conflict condition is not satisfied, the route plans of the mobile objects include an order of areas through which each of the mobile objects passes among the plurality of areas in the traveling area, and the processing circuitry is configured to create the travel timing schedules by determining timing at which the mobile objects pass through the areas included in respective route plans under a constraint that the order of the areas through which the mobile objects pass as indicated in respective route plans is not changed.

\* \* \* \* \*